United States Patent
Okugawa et al.

(10) Patent No.: US 12,155,070 B2
(45) Date of Patent: Nov. 26, 2024

(54) LITHIUM METAL COMPOSITE OXIDE POWDER AND POSITIVE ELECTRODE ACTIVE MATERIAL FOR LITHIUM SECONDARY BATTERY

(71) Applicant: SUMITOMO CHEMICAL COMPANY, LIMITED, Tokyo (JP)

(72) Inventors: Takahiro Okugawa, Niihama (JP); Keita Murakami, Niihama (JP); Marie Takemoto, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 516 days.

(21) Appl. No.: 17/602,539

(22) PCT Filed: Feb. 26, 2020

(86) PCT No.: PCT/JP2020/007702
§ 371 (c)(1),
(2) Date: Oct. 8, 2021

(87) PCT Pub. No.: WO2020/208963
PCT Pub. Date: Oct. 15, 2020

(65) Prior Publication Data
US 2022/0173392 A1    Jun. 2, 2022

(30) Foreign Application Priority Data
Apr. 12, 2019 (JP) .................................. 2019-076527

(51) Int. Cl.
*H01M 4/00* (2006.01)
*C01G 53/00* (2006.01)
(Continued)

(52) U.S. Cl.
CPC ............ *H01M 4/525* (2013.01); *C01G 53/50* (2013.01); *H01M 4/366* (2013.01); *H01M 4/505* (2013.01);
(Continued)

(58) Field of Classification Search
CPC ........ H01M 4/525; H01M 4/36; H01M 4/505; H01M 10/0525
See application file for complete search history.

(56) References Cited

U.S. PATENT DOCUMENTS

| | | | |
|---|---|---|---|
| 2009/0117469 A1 | 5/2009 | Hiratsuka et al. | |
| 2012/0009459 A1 | 1/2012 | Pitteloud et al. | |

(Continued)

FOREIGN PATENT DOCUMENTS

| | | |
|---|---|---|
| CN | 102361821 A | 2/2012 |
| CN | 104409700 A | 3/2015 |

(Continued)

OTHER PUBLICATIONS

Inoue et al., Positive Electrode Active Material for Nonaqueous Electrolyte Secondary Cell, Method for Manufacturing Said Material, and Nonaqueous Electrolyte Secondary Cell in Which Said Material is Used, Apr. 2017, See the Abstract. (Year: 2017).*

(Continued)

*Primary Examiner* — Anca Eoff
*Assistant Examiner* — Monique M Wills
(74) *Attorney, Agent, or Firm* — Rimon P.C.

(57) ABSTRACT

A lithium metal composite oxide powder having a layered structure, containing at least Li, Ni, an element X, and an element M, in which the element X is one or more elements selected from the group consisting of Co, Mn, Fe, Cu, Ti, Mg, Al, W, Mo, Nb, Zn, Sn, Zr, Ga, and V, the element M is one or more elements selected from the group consisting of B, Si, S, and P, M/(Ni+X) that is a content ratio of the (Continued)

element M to a total amount of Ni and the element X that are contained in the lithium metal composite oxide powder is 0.01 mol % or more and 5 mol % or less, Ni/(Ni+X) that is a content ratio of Ni to the total amount of Ni and the element X that are contained in the lithium metal composite oxide powder satisfies 0.40 or more in terms of a mole ratio, and a ratio of the element M eluted into N-methyl-2-pyrrolidone measured under specific measurement conditions is 0.09 or less.

10 Claims, 2 Drawing Sheets

(51) Int. Cl.
 H01M 4/36 (2006.01)
 H01M 4/505 (2010.01)
 H01M 4/525 (2010.01)
 H01M 10/0525 (2010.01)
 H01M 4/02 (2006.01)

(52) U.S. Cl.
 CPC ..... *H01M 10/0525* (2013.01); *C01P 2002/74* (2013.01); *C01P 2004/03* (2013.01); *C01P 2004/51* (2013.01); *C01P 2006/12* (2013.01); *H01M 2004/021* (2013.01); *H01M 2004/028* (2013.01)

(56) References Cited

U.S. PATENT DOCUMENTS

| | | | |
|---|---|---|---|
| 2015/0118564 A1 | 4/2015 | Shimokita et al. | |
| 2017/0133709 A1 | 5/2017 | Masuda et al. | |
| 2017/0256777 A1 | 9/2017 | Akikusa et al. | |
| 2018/0097225 A1 | 4/2018 | Yamaya et al. | |
| 2018/0131006 A1 | 5/2018 | Kokubu et al. | |
| 2019/0067689 A1* | 2/2019 | Hong | H01M 10/0525 |
| 2019/0296347 A1 | 9/2019 | Sakai | |
| 2019/0300382 A1 | 10/2019 | Kim et al. | |
| 2020/0127287 A1 | 4/2020 | Yamauchi et al. | |

FOREIGN PATENT DOCUMENTS

| | | | | |
|---|---|---|---|---|
| CN | 107293744 A | 10/2017 | | |
| CN | 107437619 A | 12/2017 | | |
| CN | 107994212 A | 5/2018 | | |
| EP | 3151317 A1 * | 4/2017 | ........... | C01G 53/006 |
| JP | H11-016566 A | 1/1999 | | |
| JP | 2009-105017 A | 5/2009 | | |
| JP | 2011-108554 A | 6/2011 | | |
| JP | 2012-204036 A | 10/2012 | | |
| JP | 2013-065409 A | 4/2013 | | |
| JP | 2015-056368 A | 3/2015 | | |
| JP | 2015-111560 A | 6/2015 | | |
| JP | 2016-033854 A | 3/2016 | | |
| JP | 2016-058257 A | 4/2016 | | |
| JP | 2016-216340 A | 12/2016 | | |
| JP | 2017-117778 A | 6/2017 | | |
| JP | 2018-045802 A | 3/2018 | | |
| JP | 2018-056051 A | 4/2018 | | |
| JP | 2018-060759 A | 4/2018 | | |
| JP | 2018-073481 A | 5/2018 | | |
| JP | 2018-095546 A | 6/2018 | | |
| JP | 2018-098217 A | 6/2018 | | |
| KR | 10-2019-0009299 A | 1/2009 | | |
| WO | 2012/176904 A1 | 12/2012 | | |
| WO | 2018/124593 A1 | 7/2018 | | |

OTHER PUBLICATIONS

Second Chinese Office Action issued in corresponding Chinese Patent Application No. 202080026679.5, dated Jun. 4, 2023, with English translation.
Chinese Office Action issued in corresponding Chinese Patent Application No. 202080026679.5, dated Nov. 28, 2022, with English translation.
Partial Supplementary European Search Report issued in corresponding European Patent Application No. 20788467.7-1108, dated Dec. 13, 2022.
Extended European Search Report issued in corresponding European Patent Application No. 20788467.7-1108, dated Mar. 16, 2023.
International Search Report issued in corresponding International Patent Application No. PCT/JP2020/007702, dated May 26, 2020, with English translation.
Japanese Notice of Reasons for Refusal issued in corresponding Japanese Patent Application No. 2019-076527, dated Oct. 8, 2019, with English translation.
Opposition issued in corresponding Japanese Patent Application No. 2019-076527, dated Oct. 19, 2020, with partial English translation.
Notice of Reason for Cancellation issued in corresponding Japanese Patent Application No. 2019-076527, dated Dec. 11, 2020, with partial English translation.
Office Action received in corresponding Korean Patent Application No. 10-2021-7031820, dated Apr. 9, 2024.

* cited by examiner

LITHIUM METAL COMPOSITE OXIDE POWDER AND POSITIVE ELECTRODE ACTIVE MATERIAL FOR LITHIUM SECONDARY BATTERY

CROSS-REFERENCE TO RELATED APPLICATIONS

This application is the U.S. National Phase under 35 U.S.C. § 371 of International Application No. PCT/JP2020/007702, filed on Feb. 26, 2020, which claims the benefit of Japanese Application No. 2019-076527, filed on Apr. 12, 2019, the entire contents of each are hereby incorporated by reference.

TECHNICAL FIELD

The present invention relates to a lithium metal composite oxide powder and a positive electrode active material for a lithium secondary battery.

BACKGROUND ART

Attempts of putting lithium secondary batteries into practical use not only for small-sized power sources in mobile phone applications, notebook personal computer applications, and the like but also for medium-sized or large-sized power sources in automotive applications, power storage applications, and the like have already been underway. In lithium secondary batteries, a positive electrode active material is used. As the positive electrode active material, a lithium metal composite oxide powder is used.

As characteristics required for lithium metal composite oxide powders, for example, little metal elution in a charged state and high long-term reliability in a charged state are exemplary examples.

For example, Patent Document 1 describes a positive electrode active material having a positive electrode mixture layer made of a material from which metal elements, excluding lithium, are eluted in a small amount when the material is immersed in an acidic aqueous solution. It is described that, even in a case where a positive electrode having such a positive electrode active material is exposed to a high potential at a high temperature, only a small amount of metal is eluted from the surface of the positive electrode active material.

In addition, Patent Document 2 describes a positive electrode active material coated with a material having a solubility of less than 1 g/L in an electrolyte composition under operating conditions of lithium ion batteries.

As described above, a variety of attempts have been made from the viewpoint of suppressing the elution of a metal component that configures a lithium metal composite oxide powder.

CITATION LIST

Patent Documents

[Patent Document 1]
Japanese Unexamined Patent Application, First Publication No. 2009-105017
[Patent Document 2]
Japanese Unexamined Patent Application, First Publication No. 2017-117778

SUMMARY OF INVENTION

Technical Problem

The present invention has been made in view of the above-described circumstances, and an object of the present invention is to provide a lithium metal composite oxide powder in which metal elution is suppressed and a positive electrode active material for a lithium secondary battery in which this lithium metal composite oxide powder is used.

Solution to Problem

That is, the present invention includes the following inventions [1] to [7].
[1] A lithium metal composite oxide powder having a layered structure, containing at least Li, Ni, an element X, and an element M, in which the element X is one or more elements selected from the group consisting of Co, Mn, Fe, Cu, Ti, Mg, Al, W, Mo, Nb, Zn, Sn, Zr, Ga, and V, the element M is one or more elements selected from the group consisting of B, Si, S, and P, M/(Ni+X) that is a content ratio of the element M to a total amount of Ni and the element X that are contained in the lithium metal composite oxide powder is 0.01 mol % or more and 5 mol % or less, Ni/(Ni+X) that is a content ratio of Ni to the total amount of Ni and the element X that are contained in the lithium metal composite oxide powder satisfies 0.40 or more in terms of a mole ratio, and a ratio of the element M eluted into N-methyl-2-pyrrolidone measured under the following measurement conditions is 0.09 or less.

(Measurement Conditions)

1 g of the lithium metal composite oxide powder is precisely weighed and immersed in N-methyl-2-pyrrolidone precisely weighed to 3.5 g, thereby preparing a measurement sample. The measurement sample is put into a closed container and left at room temperature of 25° C. for 96 hours.

After that, the measurement sample is centrifuged at 3000 rpm for 10 minutes.

After the centrifugation, 100 μL of a supernatant is collected, and the content ratio of the element M that is contained in 100 μL of the supernatant is measured.

The ratio of the element M eluted into N-methyl-2-pyrrolidone is calculated by the following equation.

Ratio of element M eluted into N-methyl-2-pyrrolidone= (amount of element M eluted into N-methyl-2-pyrrolidone)/ (amount of element M in lithium metal composite oxide powder before immersed in N-methyl-2-pyrrolidone)
[2] The lithium metal composite oxide powder according to [1], in which the element M is boron.
[3] The lithium metal composite oxide powder according to [1] or [2], in which a BET specific surface area is more than 0.30 m$^2$/g and less than 0.80 m$^2$/g.
[4] The lithium metal composite oxide powder according to any one of [1] to [3], in which $D_{50}$ that is a 50% cumulative diameter obtained from a particle size distribution measurement value is 4.1 μm or more and 10.0 μm or less.
[5] The lithium metal composite oxide powder according to any one of [1] to [4], in which, in powder X-ray diffraction measurement using a CuKα ray, a crystallite size in a peak within a range of 2θ=18.7±1° is more than 840 Å.

[6] The lithium metal composite oxide powder according to any one of [1] to [5], in which the ratio of the element M eluted into N-methyl-2-pyrrolidone is more than 0.001 and 0.04 or less.

[7] A positive electrode active material for a lithium secondary battery, containing the lithium metal composite oxide powder according to any one of [1] to [6].

Furthermore, as the aspect of the present invention, the following aspects are exemplary examples.

[8] A positive electrode having the positive electrode active material for a lithium secondary battery according to [7].

[9] A positive electrode for a lithium secondary battery, in which a ratio (XA) occupied by $Li_{55\ eV}$ that is calculated by the following equation (A) from a spectrum obtained by measuring a surface of the positive electrode for a lithium secondary battery by XPS is 30% or more.

$$XA = Li_{55\ eV}/(Li_{54\ eV} + Li_{55\ eV}) \times 100 \quad (A)$$

(In the equation (A), $Li_{54\ eV}$ is a peak area of a peak at 54 eV that appears at the time of waveform separation of the spectrum obtained by measuring the surface of the positive electrode for a lithium secondary battery by XPS, and $Li_{55\ eV}$ means a peak area of a peak at 55 eV.)

[10] A lithium secondary battery having the positive electrode for a lithium secondary battery according to [8] or [9].

[11] The lithium secondary battery according to [10], further having a separator.

[12] The lithium secondary battery according to [11], in which the separator is a separator made of a laminate film in which a heat-resistant porous layer and a porous film are laminated.

Advantageous Effects of Invention

According to the present invention, it is possible to provide a lithium metal composite oxide powder in which metal elution is suppressed and a positive electrode active material for a lithium secondary battery in which this lithium metal composite oxide powder is used.

DESCRIPTION OF EMBODIMENTS

<Lithium Metal Composite Oxide Powder>

Figure 1A:
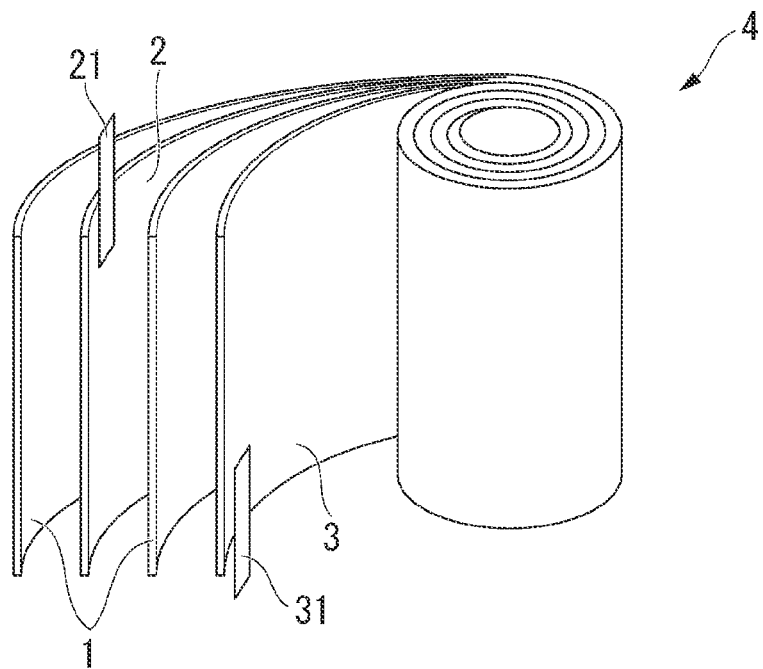
FIG. 1A is a schematic configuration view showing an example of a lithium secondary battery.

A lithium metal composite oxide powder of the present embodiment has a layered structure.

The lithium metal composite oxide powder of the present embodiment contains at least Li, Ni, an element X, and an element M.

The element X is one or more elements selected from the group consisting of Co, Mn, Fe, Cu, Ti, Mg, Al, W, Mo, Nb, Zn, Sn, Zr, Ga, and V.

The element M is one or more elements selected from the group consisting of B, Si, S, and P.

From the viewpoint of obtaining a lithium secondary battery having a high initial charge and discharge efficiency and a high cycle retention rate, the element X in the present embodiment is preferably one or more elements selected from the group consisting of Co, Mn, Ti, Mg, Al, W, and Zr and is more preferably one or more elements selected from the group consisting of Co, Mn, Al, W, and Zr.

In the present embodiment, a compound having the element M has lithium ion conductivity. In the present embodiment, from the viewpoint of obtaining a lithium secondary battery in which the initial charge and discharge efficiency is high and metal elution is suppressed, the element M is preferably one or more elements selected from the group consisting of B, S, and P and more preferably B.

In the present embodiment, M/(Ni+X) that is the content ratio of the element M to the total amount of Ni and the element X that are contained in the lithium metal composite oxide powder is 0.01 mol % or more and 5 mol % or less. As the lower limit value of the content ratio of the element M, 0.02 mol %, 0.03 mol %, and 0.04 mol % are exemplary examples. As the upper limit value of the content ratio of the element M, 4.9 mol %, 4.8 mol %, and 4.7 mol % are exemplary examples.

The upper limit value and the lower limit value of the content ratio of the element M can be randomly combined. As examples of the combination, the content ratios of the element M of 0.02 mol % or more and 4.9 mol % or less, 0.03 mol % or more and 4.8 mol % or less, and 0.04 mol % or more and 4.7 mol % or less are exemplary examples.

When the content ratio of the element M is equal to or more than the above-described lower limit value, it is possible to prevent the metal components that are contained in the lithium metal composite oxide powder from being eluted into electrolytic solutions. In addition, when the content ratio of the element M is equal to or less than the above-described upper limit value, it is possible to decrease battery resistance in a case where the element M is used as a positive electrode active material together with the lithium metal composite oxide powder.

The content ratio of the element M to the total amount of Ni and the element X in the lithium metal composite oxide powder can be determined by, for example, the following method.

After the lithium metal composite oxide powder is dissolved in hydrochloric acid, the composition analysis of the lithium metal composite oxide powder is carried out using an inductively coupled plasma (ICP) emission spectrometer (for example, SPS3000 manufactured by Seiko Instruments Inc.). From the analysis result, the content ratio of the element M to the total amount of Ni and the element X is calculated.

Combination of Element M and Element X

In the present embodiment, as the combination of the element M and the element X, the following combinations are exemplary examples.

The element M is B, and the element X is Co and Mn.
The element M is B, and the element X is Co, Mn, and Al.
The element M is B, and the element X is Co, Mn, and Zr.
The element M is B, and the element X is Co, Mn, Al, and Zr.
The element M is S, and the element X is Co and Mn.
The element M is S, and the element X is Co, Mn, and Al.
The element M is S, and the element X is Co, Mn, and Zr.
The element M is S, and the element X is Co, Mn, Al, and Zr.

In the present embodiment, Ni/(Ni+X) that is the content ratio of Ni to the total amount of Ni and the element X that are contained in the lithium metal composite oxide powder satisfies 0.40 or more in terms of the mole ratio and is preferably 0.45 or more, more preferably 0.50 or more, and particularly preferably 0.55 or more. The upper limit value of the content ratio of Ni is not particularly limited, and, as examples, 0.90, 0.85, and 0.80 are exemplary examples.

The upper limit value and the lower limit value of the content ratio of the Ni can be randomly combined. As examples of the combination, the content ratios of the Ni of 0.45 or more and 0.90 or less, 0.50 or more and 0.85 or less, and 0.55 or more and 0.80 or less are exemplary examples.

When the content ratio of the Ni is within the above-described range, it is possible to improve the discharge capacity.

The content ratio of Ni to the total amount of Ni and the element X in the lithium metal composite oxide powder can be determined by, for example, the following method. After the lithium metal composite oxide powder is dissolved in hydrochloric acid, the composition analysis of the lithium metal composite oxide powder is carried out using an inductively coupled plasma (ICP) emission spectrometer (for example, SPS3000 manufactured by Seiko Instruments Inc.). From the analysis result, the mole ratio of the content ratio of Ni to the total amount of Ni and the element X is calculated.

The lithium metal composite oxide powder of the present embodiment preferably includes core particles containing at least Li, Ni, and the element X and a coating material that coats the surface of the core particles. The coating material is preferably a coating layer or coating particles.

The coating material contains a compound obtained by a reaction between an element M and lithium.

As the compound that forms the coating material, a compound in which the element M, lithium, and oxygen bond to one another is an exemplary example.

In the present embodiment, "coating" means that the coating material is present on a part or all of the surfaces of the core particles. In a case where a part of the surfaces of the core particles are coated with the coating material, the coating material is preferably distributed in a region that is at least 50% or more of the surfaces of the core particles and more preferably distributed in a region of 70% or more.

Regarding a layer of the coating material, coating layers having a uniform thickness are preferably formed on the surfaces of the core particles.

In the present embodiment, the composition of the coating material can be confirmed using a scanning transmission electron microscope (STEM)-energy-dispersive X-ray spectroscopy (EDX) element line analysis, ICP emission spectrometry, an electron beam microanalyzer analysis, or the like of the cross section of a particle. The crystal structure of the coating layer can be confirmed using powder X-ray diffraction or electron beam diffraction.

The coating material is considered to contain the element M. In a case where the lithium metal composite oxide powder of the present embodiment includes the coating material containing the element M, the core particles are protected by the coating material. Therefore, in a charged or discharged state, it is possible to suppress the elution of a metal component that configures the core particles due to hydrofluoric acid in an electrolytic solution when the core particles come into contact with the electrolytic solution.

In the lithium metal composite oxide powder of the present embodiment, the ratio of the element M eluted into N-methyl-2-pyrrolidone measured under the following measurement conditions is 0.09 or less.

(Measurement Conditions)

1 g of the lithium metal composite oxide powder is precisely weighed and immersed in N-methyl-2-pyrrolidone precisely weighed to 3.5 g, thereby preparing a measurement sample. The measurement sample is put into a closed container and left at room temperature of 25° C. for 96 hours.

After that, the measurement sample is centrifuged at 3000 rpm for 10 minutes.

After the centrifugation, 100 µL of a supernatant is collected, and the content ratio of the element M that is contained in 100 µL of the supernatant is measured with an ICP emission spectrometer.

From the content ratio of the element M that is contained in 100 µL of the supernatant, the amount of the element M eluted into N-methyl-2-pyrrolidone is calculated by the following method.

Amount of element M eluted into N-methyl-2-pyrrolidone=3.5 (g) x content ratio of element M contained in 100 µL of supernatant (ppm)

Furthermore, the amount of the element M in the lithium metal composite oxide powder before being immersed in N-methyl-2-pyrrolidone is calculated by the following method.

After the lithium metal composite oxide powder is dissolved in hydrochloric acid, the content ratio (ppm) of the element M with respect to the total amount of the lithium metal composite oxide powder is measured using an ICP emission spectrometer. A value obtained by multiplying the measurement value by one becomes the amount of the element M that is contained in 1 g of the lithium metal composite oxide powder.

The ratio of the element M eluted into N-methyl-2-pyrrolidone is calculated by the following equation from the values obtained above.

Ratio of element M eluted into N-methyl-2-pyrrolidone= (amount of element M eluted into N-methyl-2-pyrrolidone)/ (amount of element M in lithium metal composite oxide powder before immersed in N-methyl-2-pyrrolidone)

Here, N-methyl-2-pyrrolidone that is used for the measurement is an organic solvent that is widely used when an electrode mixture is made into a paste (slurry) to produce an electrode. Hereinafter, there will be cases where this organic solvent is referred to as "slurry-form solvent".

In the present embodiment, the ratio of the element M eluted into N-methyl-2-pyrrolidone is preferably more than 0.001 and 0.04 or less.

The fact that the ratio of the element M eluted into N-methyl-2-pyrrolidone is equal to or less than the above-described upper limit value means that the elution of the element M into the slurry-form solvent can be suppressed at the time of kneading the slurry for the production of an electrode. In this case, since it is considered unlikely that the coating material becomes deficient during the kneading of the slurry, it is possible to suppress the elution of the metal component that configures the core particles into the electrolytic solution.

When the ratio of the element M eluted into N-methyl-2-pyrrolidone is equal to or less than the above-described lower limit value, it is considered that the affinity to the organic solvent is poor and it is difficult to rapidly trade lithium ions between the electrolytic solution and the lithium metal composite oxide powder.

For the lithium metal composite oxide powder in which the ratio of the element M eluted into N-methyl-2-pyrrolidone is in the above-described range, it is presumed that the amount of the element M eluted may be approximately the same even in other slurry-form solvents. Here, as the other slurry-form solvents, amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide are exemplary examples.

At the time of producing an electrode, a positive electrode active material for a lithium secondary battery is kneaded with a conductive aid, a binder, and, furthermore, a slurry-form solvent to be made into a slurry. In a case where the lithium metal composite oxide powder is used as the positive electrode active material for a lithium secondary battery, it is assumed that a metal component that configures the lithium metal composite oxide powder is eluted in a slurry production step. When a component that configures the surface of the lithium metal composite oxide powder is eluted in the slurry production step, the component becomes deficient on the surface, which causes an essential metal element such as nickel to be eluted.

In the lithium metal composite oxide powder of the present embodiment, since the ratio of the element M eluted into N-methyl-2-pyrrolidone is as low as the above-described range, it is presumed that metal elution into the slurry-form solvent can be suppressed in the slurry production step.

The lithium metal composite oxide powder of the present embodiment is preferably represented by the following composition formula (I).

$$Li[Li_{n1}(Ni_{(1-z-w)}X_zM_w)_{1-n1}]O_2 \quad (I)$$

(Here, X is one or more elements selected from the group consisting of Co, Mn, Fe, Cu, Ti, Mg, Al, W, Mo, Nb, Zn, Sn, Zr, Ga, and V, M is one or more elements selected from the group consisting of B, Si, S, and P, and $0 \leq n1 \leq 0.2$, $0 < z \leq 0.6$, and $0 < w \leq 0.05$ are satisfied.)

n1

In the composition formula (I), n1 is 0 or more, preferably 0.001 or more, more preferably 0.002 or more, and particularly preferably 0.003 or more from the viewpoint of improving cycle characteristics. In addition, n1 is 0.2 or less, preferably 0.19 or less, more preferably 0.18 or less, and particularly preferably 0.17 or less.

The above-described upper limit value and lower limit value of n1 can be randomly combined together. As examples of the combination, n1 of $0 \leq n1 \leq 0.19$, $0.001 \leq n1 \leq 0.18$, $0.002 \leq n1 \leq 0.17$, and $0.003 \leq n1 \leq 0.17$ are exemplary examples.

Z

In the composition formula (I), z is more than 0, preferably 0.001 or more, and more preferably 0.02 or more from the viewpoint of improving cycle characteristics. In addition, z is 0.6 or less, preferably 0.59 or less, more preferably 0.57 or less, and particularly preferably 0.55 or less.

The above-described upper limit value and lower limit value of z can be randomly combined together. As examples of the combination, z of $0 < z \leq 0.59$, $0.001 \leq z \leq 0.57$, and $0.02 \leq z \leq 0.55$ are exemplary examples.

W

In the composition formula (I), w is more than 0, preferably 0.001 or more, and more preferably 0.005 or more from the viewpoint of suppressing metal elution. In addition, w is 0.05 or less, preferably 0.045 or less, more preferably 0.04 or less, and particularly preferably 0.03 or less.

The above-described upper limit value and lower limit value of w can be randomly combined together. As examples of the combination, w of $0 < w \leq 0.045$, $0.001 \leq w \leq 0.04$, and $0.005 \leq w \leq 0.03$ are exemplary examples.

In the present embodiment, the composition formula (I) is preferably the following composition formula (I)-1.

$$Li[Li_{n1}(Ni_{(1-y-z-w)}Co_yMn_zM_w)_{1-n1}]O_2 \quad (I)-1$$

(Here, $-0.1 \leq n1 \leq 0.2$, $0 < y \leq 0.4$, $0 < z \leq 0.4$, $0 < w \leq 0.05$, and $y+z+w<1$.)

From the viewpoint of obtaining a lithium secondary battery having high cycle characteristics, in the composition formula (I)-1, $0 < y+z+w < 1$ is preferable, $0 < y+z+w \leq 0.6$ is more preferable, $0 < y+z+w \leq 0.55$ is still more preferable, and $0 < y+z+w \leq 0.5$ is particularly preferable.

In addition, from the viewpoint of obtaining a lithium secondary battery having a low battery internal resistance, y in the composition formula (I)-1 is preferably more than 0 and 0.005 or more, more preferably 0.01 or more, and still more preferably 0.05 or more. In addition, from the viewpoint of obtaining a lithium secondary battery having high thermal stability, y in the composition formula (I)-1 is 0.4 or less, preferably 0.35 or less, and more preferably 0.33 or less.

The upper limit value and the lower limit value of y can be randomly combined together.

As examples of the combination of the upper limit value and the lower limit value of y, $0 < y \leq 0.35$, $0.005 \leq y \leq 0.4$, $0.01 \leq y \leq 0.35$, and $0.05 \leq y \leq 0.33$ are exemplary examples.

In the present embodiment, $0 < y \leq 0.35$ is preferable.

In addition, from the viewpoint of obtaining a lithium secondary battery having high cycle characteristics, z in the composition formula (I)-1 is more than 0, preferably 0.01 or more, more preferably 0.02 or more, and still more preferably 0.1 or more. In addition, from the viewpoint of obtaining a lithium secondary battery having excellent preservation characteristics at high temperatures (for example, in an environment at 60° C.), z in the composition formula (I)-1 is 0.4 or less, preferably 0.39 or less, more preferably 0.38 or less, and still more preferably 0.35 or less.

The upper limit value and the lower limit value of z can be randomly combined together.

As examples of the combination of the upper limit value and the lower limit value of z, $0 < z \leq 0.35$, $0.01 \leq z \leq 0.39$, $0.02 \leq z \leq 0.38$, and $0.05 \leq z \leq 0.35$ are exemplary examples.

In the present embodiment, $0 < z \leq 0.35$ is preferable.

In the present embodiment, the composition of the lithium metal composite oxide powder can be confirmed by dissolving the obtained lithium metal composite oxide powder in hydrochloric acid and then carrying out an analysis using an inductively coupled plasma emission spectrometer.

As the inductively coupled plasma emission spectrometer, it is possible to use, for example, SPS3000 manufactured by Seiko Instruments Inc.

In the lithium metal composite oxide powder of the present embodiment, the BET specific surface area is preferably more than 0.30 m²/g and less than 0.80 m²/g.

In the lithium metal composite oxide powder of the present embodiment, the BET specific surface area is more preferably 0.35 m²/g or more, still more preferably 0.40 m²/g or more, and particularly preferably 0.45 m²/g or more. In the lithium metal composite oxide powder of the present embodiment, the BET specific surface area is preferably less than 0.80 m²/g, more preferably less than 0.70 m²/g, and still more preferably less than 0.60 m²/g.

The upper limit value and the lower limit value of the BET specific surface area can be randomly combined together.

As the combination of the upper limit value and the lower limit value of the BET specific surface area, more than 0.30 m²/g and less than 0.79 m²/g, 0.35 m²/g or more and less than 0.60 m²/g, and 0.45 m²/g or more and less than 0.60 m²/g are exemplary examples.

The BET specific surface area can be measured by the following method.

First, 1 g of the lithium metal composite oxide powder is dried at 105° C. for 30 minutes in a nitrogen atmosphere. After that, the BET specific surface area is measured using a BET specific surface area measuring device. As the BET specific surface area measuring device, for example, Macsorb (registered trademark) manufactured by Mountech Co., Ltd. can be used.

In the lithium metal composite oxide powder of the present embodiment, $D_{50}$ that is the 50% cumulative diameter obtained from a particle size distribution measurement value is preferably 4.1 μm or more and 10.0 μm or less.

The lower limit value of $D_{50}$, which is the 50% cumulative diameter, is preferably 4.1 μm or more, more preferably 4.2 μm or more, and still more preferably 4.3 μm or more.

The upper limit value of $D_{50}$, which is the 50% cumulative diameter, is preferably 9.0 μm or less, more preferably 8.0 μm or less, and still more preferably 7.0 μm or less.

The upper limit value and the lower limit value of $D_{50}$, which is the 50% cumulative diameter, can be randomly combined. In the present embodiment, $D_{50}$, which is the 50% cumulative diameter, is preferably 4.1 μm or more and 9.0 μm or less, more preferably 4.2 μm or more and 8.0 μm or less, and still more preferably 4.3 μm or more and 7.0 μm or less.

The particle size distribution of the lithium metal composite oxide powder can be measured by the following method.

First, 0.1 g of the lithium metal composite oxide powder to be measured is poured into 50 ml of 0.2 mass % sodium hexametaphosphate aqueous solution to obtain a dispersion liquid in which the powder is dispersed.

Next, the particle size distribution of the obtained dispersion liquid is measured using a laser diffraction scattering particle size distribution measuring device to obtain a volume-based cumulative particle size distribution curve.

Next, in the obtained cumulative particle size distribution curve, the volume particle size at the time of 50% accumulation is defined as $D_{50}$, which is the 50% cumulative volume particle size of the lithium metal composite oxide powder.

As the laser diffraction scattering particle size distribution measuring device, for example, a MASTERSIZER 2000 manufactured by Malvern Panalytical Ltd. can be used.

In the lithium metal composite oxide powder of the present embodiment, in powder X-ray diffraction measurement using a CuKα ray, $L_A$ that is a crystallite size calculated from a diffraction peak within a range of 2θ=18.7±1° is preferably more than 840 Å, more preferably 850 Å or more, and particularly preferably 860 Å or more. The upper limit value of $L_A$ is, for example, 930 Å, 920 Å, or 900 Å.

The upper limit value and the lower limit value of $L_A$ can be randomly combined together.

As the combination of the upper limit value and the lower limit value of $L_A$, more than 840 Å and 930 Å or less, more than 840 Å and 920 Å or less, 850 Å or more and 900 Å or less, and 860 Å or more and 900 Å or less are exemplary examples.

In the lithium metal composite oxide powder of the present embodiment, in powder X-ray diffraction measurement using a CuKα ray, $L_B$ that is a crystallite size calculated from a diffraction peak within a range of 2θ=44.6±1° is preferably more than 800 Å, more preferably 810 Å or more, and particularly preferably 820 Å or more. The upper limit value of $L_B$ is, for example, 1000 Å, 980 Å, or 960 Å.

The upper limit value and the lower limit value of $L_B$ can be randomly combined together.

As the combination of the upper limit value and the lower limit value of $L_B$, more than 800 Å and 1000 Å or less, 810 Å or more and 980 Å or less, and 820 Å or more and 960 Å or less are exemplary examples.

In the present embodiment, $L_A/L_B$, which is the ratio of $L_A$ to $L_B$, is preferably 0.90 or more, more preferably 0.91 or more, and particularly preferably 0.92 or more. $L_A/L_B$ is, for example, 1.3, 1.1, or 1.0.

The upper limit value and the lower limit value of $L_A/L_B$ can be randomly combined together.

As the combination of the upper limit value and the lower limit value of $L_A/L_B$, 0.90 or more and 1.3 or less, 0.91 or more and 1.1 or less, and 0.92 or more and 1.0 or less are exemplary examples.

The crystallite size of the lithium metal composite oxide powder can be measured by the following method.

First, a powder X-ray diffraction pattern for Rietveld analysis of the lithium metal composite oxide powder is acquired from powder X-ray diffraction measurement, in which a CuKα ray is used, using an X-ray diffraction device (XRD device).

Next, the acquired X-ray diffraction pattern is analyzed using X-ray analysis software.

The crystallite size calculated from a diffraction peak within a range of 2θ=18.7±1° obtained by the analysis is indicated by $L_A$, the crystallite size calculated from a diffraction peak within a range of 2θ=44.6±1° is indicated by $L_B$, and furthermore, the value of $L_A/L_B$, which is the ratio of $L_A$ to $L_B$, is calculated.

As the XRD device, for example, D8 Advance manufactured by Bruker can be used.

As the X-ray analysis software, powder X-ray analysis software TOPASD8 manufactured by Bruker can be used. In the case of using this software, the analysis is preferably carried out in consideration of parameters specific to the apparatus D8 Advance.

In the lithium metal composite oxide powder of the present embodiment, the amount of residual lithium that is measured by the neutralization titration method is preferably 0.6 mass % or less. The amount of residual lithium refers to the amount of a Li element calculated from the total amount of the amount of lithium carbonate and the amount of lithium hydroxide that are contained in a residual alkali of the lithium metal composite oxide powder that are measured by neutralization titration.

The amount of residual lithium in the lithium metal composite oxide powder is measured by the following method.

First, 20 g of the lithium metal composite oxide powder and 100 g of pure water are put into a 100 ml beaker and stirred for five minutes.

After stirring, the lithium metal composite oxide powder is filtered, 0.1 mol/L of hydrochloric acid is added dropwise to 60 g of the remaining filtrate, and the pH of the filtrate is measured with a pH meter.

The amount of hydrochloric acid added for titration at pH=8.3±0.1 is indicated by A ml.

The amount of hydrochloric acid added for titration at pH=4.5±0.1 is indicated by B ml.

The amount of lithium carbonate and the amount of lithium hydroxide that remain in the lithium metal composite oxide powder are calculated from the following calculation equation. In the following equation, the molecular weights of lithium carbonate and lithium hydroxide are calculated with an assumption that the individual atomic weights are H: 1.000, Li: 6.941, C: 12.000, and O: 16.000.

Amount of lithium carbonate (mass %)={0.1×(B−A)/1000}×{73.882/(20×60/100)}×100

Amount of lithium hydroxide (mass %)={0.1×(2A−B)/1000}×{23.941/(20×60/100)}×100

(Layered Structure)

In the present embodiment, the crystal structure of the lithium metal composite oxide powder is a layered structure and more preferably a hexagonal crystal structure or a monoclinic crystal structure.

The hexagonal crystal structure belongs to any one space group selected from the group consisting of P3, P3$_1$, P3$_2$, R3, P-3, R-3, P312, P321, P3$_1$12, P3$_1$21, P3$_2$12, P3$_2$21, R32, P3 m1, P31m, P3c1, P31c, R3m, R3c, P-31m, P-31c, P-3 m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$cm, P6$_3$mc, P-6m2, P-6c2, P-62m, P-62c, P6/mmm, P6/mcc, P6$_3$/mcm, and P63/mmc.

In addition, the monoclinic crystal structure belongs to any one space group selected from the group consisting of P2, P2$_1$, C2, Pm, Pc, Cm, Cc, P2/m, P2$_1$/m, C2/m, P2/c, P2$_1$/c, and C2/c.

Among these, in order to obtain a lithium secondary battery having a high discharge capacity, the crystal structure is particularly preferably a hexagonal crystal structure belonging to the space group R-3m, or a monoclinic crystal structure belonging to C2/m.

The fact that the elution of the metal component that configures the lithium metal composite oxide powder of the present embodiment is suppressed can be confirmed by the following method.

(Production of Positive Electrode)

First, a paste-form positive electrode mixture is prepared by adding and kneading a lithium metal composite oxide powder obtained by the manufacturing method described later, a conductive material (acetylene black), and a binder (PVdF) in ratios in which a composition of lithium metal composite oxide powder:conductive material:binder=92:5:3 (mass ratio) is achieved. During the preparation of the positive electrode mixture, for example, N-methyl-2-pyrrolidone is used as an organic solvent.

The obtained positive electrode mixture is applied to a 40 μm-thick Al foil, which is to serve as a current collector, dried at 60° C. for one hour, and dried in a vacuum at 150° C. for eight hours, thereby obtaining a positive electrode for a lithium secondary battery. An example of the electrode area of this positive electrode for a lithium secondary battery is, for example, 34.96 cm².

(Production of Negative Electrode)

A paste-form negative electrode mixture is prepared by adding and kneading artificial graphite, styrene-butadiene rubber (SBR), and carboxymethylcellulose (CMC) in ratios in which a composition of artificial graphite:SBR:CMC=98:1:1 (mass ratio) is achieved. During the preparation of the negative electrode mixture, for example, pure water is used as a solvent.

The obtained negative electrode mixture is applied to a 12 μm-thick Cu foil, which is to serve as a current collector, dried at 60° C. for one hour, and dried in a vacuum at 120° C. for eight hours, thereby obtaining a negative electrode for a lithium secondary battery. The electrode area of this negative electrode for the lithium secondary battery is, for example, 37.44 cm².

A single-layer laminate cell is produced using the obtained positive electrode, the obtained negative electrode (artificial graphite), a separator (made of polypropylene (thickness: 25 μm)), and an electrolytic solution (obtained by dissolving LiPF$_6$ in a liquid mixture of ethylene carbonate, dimethyl carbonate, and ethyl methyl carbonate at a volume ratio of 16:10:74 to reach 1.3 mol/L.

The laminate cell is subjected to formation under the following conditions, then, charged up to 4.3 V, and stored in a constant temperature vessel at 60° C. for seven days.

Formation conditions: The laminate cell is charged up to a SOC of 10% at 0.05 CA at a testing temperature of 25° C., left at a testing temperature of 60° C. for 10 hours, and then CC-CV-charged up to 4.3 V at 0.1 CA at a testing temperature of 25° C. until the current reaches 0.05 CA.

Furthermore, the laminate cell is discharged up to 2.5 V at 0.2 CA and charged and discharged at 0.2 CA two cycles.

The laminate cell discharged up to 2.5 V at a current value of 0.2 CA after stored is disassembled in a glove box under an Ar atmosphere, the negative electrode is removed, and the laminate cell is left for one hour to volatilize the electrolytic solution.

From the negative electrode removed from the glove box, 100 mg of the negative electrode mixture is scraped off with a TEFLON (registered trademark) rod, put into 8 ml of concentrated nitric acid, irradiated with microwave irradiation at 1000 W for 42 minutes, heated, and extracted, and 100 μL of a supernatant is collected with a micropipette, and the content ratio of Ni that is contained in the supernatant is measured with an ICP emission spectrometer.

As the ICP emission spectrometer, for example, ELAN DRCII, manufacturer name: PerkinElmer Co., Ltd. can be used.

The content ratio of Ni in the negative electrode mixture can be measured by the above-described measurement. The content ratio of Ni in the negative electrode mixture is multiplied by the weight of the negative electrode mixture that is contained in the laminate cell and divided by the lithium metal composite oxide powder that is contained in the laminate cell, thereby calculating the amount of Ni eluted per amount of the lithium metal composite oxide powder weight.

In the present embodiment, the amount of Ni elution per amount of the lithium metal composite oxide powder calculated by the above-described method is preferably 10 μg/g or less.

<Method for Producing Lithium Metal Composite Oxide Powder>

A method for producing the lithium metal composite oxide powder of the present embodiment includes a step of mixing a precursor of the lithium metal composite oxide powder and a lithium compound to obtain a mixture, a step of calcining the mixture to obtain a raw material compound, and a step of adding a compound containing the element M to the raw material compound and thermally treating the mixture.

[Step of Obtaining Mixture]

The present step is a step of mixing a lithium compound and the precursor to obtain a mixture.

Precursor of Lithium Metal Composite Oxide Powder

In the production of the lithium metal composite oxide powder, first, a precursor is produced.

The precursor is a metal composite compound containing the element X (one or more metals selected from the group consisting of Co, Mn, Fe, Cu, Ti, Mg, Al, W, Mo, Nb, Zn, Sn, Zr, Ga, and V). As the metal composite compound, a metal composite hydroxide or a metal composite oxide is preferable.

Hereinafter, there will be cases where the precursor is referred to as "metal composite compound".

(Step of Producing Metal Composite Compound)

Usually, the metal composite compound can be produced by a well-known batch coprecipitation method or continuous coprecipitation method. Hereinafter, the production method will be described in detail using a metal composite hydroxide containing nickel, cobalt, and manganese as metals as an example.

First, a nickel salt solution, a cobalt salt solution, a manganese salt solution, and a complexing agent are reacted with one another by a coprecipitation method, particularly, the continuous coprecipitation method described in Japanese Unexamined Patent Application, First Publication No. 2002-201028, thereby producing a nickel cobalt manganese metal composite hydroxide represented by $Ni_{(1-y-z)}Co_yMn_z(OH)_2$. y and z in $Ni_{(1-y-z)}Co_yMn_z(OH)_2$ correspond to y and z in the composition formula (I)-1.

A nickel salt, which is the solute of the nickel salt solution, is not particularly limited, and, for example, any one or more of nickel sulfate, nickel nitrate, nickel chloride, and nickel acetate can be used.

As a cobalt salt, which is the solute of the cobalt salt solution, for example, any one or more of cobalt sulfate, cobalt nitrate, and cobalt chloride can be used.

As a manganese salt, which is a solute of the manganese salt solution, for example, any one or more of manganese sulfate, manganese nitrate, and manganese chloride can be used.

The above-described metal salts are used in a ratio corresponding to the composition ratio of $Ni_{(1-y-z)}Co_yMn_z(OH)_2$. That is, the individual metal salts are used in amounts in which the mole ratio among nickel in the solute of the nickel salt solution, cobalt in the solute of the cobalt salt solution, and manganese in the solute of the manganese salt solution corresponds to the composition ratio of $Ni_{(1-y-z)}Co_yMn_z(OH)_2$ and becomes (1−y−z):y:z.

The content ratio (Ni/(Ni+X)) of Ni to the total amount of Ni and the element X of the lithium metal composite oxide powder can be adjusted by adjusting the amount of each metal salt.

In addition, as the solvents of the nickel salt solution, the cobalt salt solution, and the manganese salt solution, water can be used.

The complexing agent is a compound capable of form a complex with a nickel ion, a cobalt ion, and a manganese ion in an aqueous solution. Examples of the complexing agent include an ammonium ion feeder, hydrazine, ethylenediaminetetraacetic acid, nitrilotriacetic acid, uracil diacetic acid, and glycine. The complexing agent may or may not be contained. In a case where the complexing agent is contained, for example, the mole ratio of the amount of the complexing agent contained in the liquid mixture containing the nickel salt solution, the cobalt salt solution, the manganese salt solution, and the complexing agent to the total number of moles of the metal salts of nickel, cobalt, and manganese is more than 0 and 2.0 or less.

As the ammonium ion feeder, ammonium salts such as ammonium hydroxide, ammonium sulfate, ammonium chloride, ammonium carbonate and ammonium fluoride are exemplary examples.

In the coprecipitation method, in order to adjust the pH value of the liquid mixture containing the nickel salt solution, a random metal salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of the pH in the present specification is defined as a value measured when the temperature of the liquid mixture is 40° C. The pH of the liquid mixture is measured when the temperature of the liquid mixture sampled from a reaction vessel reaches 40° C. In a case where the sampled liquid mixture is lower than 40° C., the liquid mixture is heated up to 40° C. and the pH is measured. In a case where the sampled liquid mixture exceeds 40° C., the pH of the liquid mixture cooled to 40° C. is measured.

When the complexing agent in addition to the nickel salt solution, the cobalt salt solution, and the manganese salt solution is continuously supplied to the reaction vessel, nickel, cobalt, and manganese react with one another, and $Ni_{(1-y-z)}Co_yMn_z(OH)_2$ is generated.

At the time of the reaction, the temperature of the reaction vessel is controlled in a range of, for example, 20° C. or higher and 80° C. or lower and preferably 30° C. or higher and 70° C. or lower.

At the time of the reaction, the pH value in the reaction vessel is controlled within a range of, for example, pH 9 or higher and pH 13 or lower and preferably pH 11 or higher and pH 13 or lower when the temperature of the aqueous solution is 40° C.

The substances in the reaction vessel are appropriately stirred and mixed together.

As the reaction vessel that is used in the continuous coprecipitation method, it is possible to use a reaction vessel in which the formed reaction product is caused to overflow for separation.

When the metal salt concentrations, stirring speeds, reaction temperature, and reaction pHs of the metal salt solutions that are supplied to the reaction vessel, calcining conditions, which will be described below, and the like are appropriately controlled, it is possible to control a lithium metal composite oxide powder to be obtained in the end to desired physical properties.

In detail, the inside of the reaction vessel may be an inert atmosphere. An inert atmosphere inside the reaction vessel suppresses, among the metals that are contained in the liquid mixture, a metal that is more easily oxidized than nickel being aggregated earlier than nickel. Therefore, a uniform metal composite hydroxide can be obtained.

In addition, the inside of the reaction vessel may be an appropriate oxidizing atmosphere. The oxidizing atmosphere may be an oxygen-containing atmosphere formed by mixing an oxidizing gas into an inert gas, and, when the inside of the reaction vessel, in which an oxidizing agent may be present in an inert gas atmosphere, is an appropriate oxidizing atmosphere, a transition metal that is contained in the liquid mixture is appropriately oxidized, which makes it easy to control the form of the metal composite oxide.

As the oxidizing agent, it is possible to use a peroxide such as hydrogen peroxide, a peroxide salt such as permanganate, perchlorate, hypochlorite, nitric acid, halogen, ozone, or the like.

As oxygen or the oxidizing agent in the oxidizing atmosphere, a sufficient number of oxygen atoms need to be present in order to oxidize the transition metal.

In a case where the oxidizing atmosphere is an oxygen-containing atmosphere, the atmosphere in the reaction vessel can be controlled by a method in which an oxidizing gas is bubbled or the like in the liquid mixture that aerates the oxidizing gas into the reaction vessel.

After the above-described reaction, the obtained reaction product is washed with water and then dried, thereby obtaining a nickel cobalt manganese composite hydroxide as a nickel cobalt manganese composite compound.

In addition, in a case where impurities derived from the liquid mixture remain in the reaction product that is washed with only water, the reaction product may be washed with a weak acid water or an alkaline solution as necessary. As the alkaline solution, an aqueous solution containing sodium hydroxide or potassium hydroxide is an exemplary example.

In the above-described example, the nickel cobalt manganese composite hydroxide has been produced, but a nickel cobalt manganese composite oxide may be prepared. For example, a nickel cobalt manganese composite oxide can be prepared by calcining the nickel cobalt manganese composite hydroxide. Regarding the calcining time, the total time taken while the temperature begins to be raised and reaches the calcining temperature and the holding of the composite metal hydroxide at the calcining temperature ends is preferably set to one hour or longer and 30 hours or shorter. The temperature rising rate in the heating step until the highest holding temperature is reached is preferably 180° C./hour or faster, more preferably 200° C./hour or faster, and particularly preferably 250° C./hour or faster.

When a composite oxide of Ni and the element X is adjusted from the composite hydroxide of Ni and the element X, an oxide production step of producing an oxide by calcining the composite hydroxide at a temperature of 300° C. or higher and 800° C. or lower in a range of one hour or longer and 10 hours or shorter may be carried out.

In the present embodiment, the secondary particle diameter ($D_{50}$) of the precursor is preferably adjusted to 2 μm or more and 15 μm or less. When the secondary particle diameter ($D_{50}$) of the precursor is controlled, it becomes easy to uniformly form a coating layer on the surface of the lithium metal composite oxide powder in the subsequent step of adding a compound containing the element M to the raw material compound and thermally treating the mixture.

This makes it possible to control the ratio of the element M eluted into N-methyl-2-pyrrolidone to be within the range of the present embodiment.

In addition, when the secondary particle diameter ($D_{50}$) of the precursor is adjusted to 2 μm or more and 15 μm or less, it becomes easy to control $D_{50}$, which is the 50% cumulative diameter, and BET specific surface area of a lithium metal composite oxide powder to be produced to be within the ranges of the present embodiment.

As a method for adjusting the secondary particle diameter ($D_{50}$) of the precursor to 2 μm or more and 15 μm or less, a method in which the reaction pH is controlled to be 10 or more and 13 or less and also controlled to be within ±0.3 of a reaction pH for which a pH fluctuation width during a reaction is set is an exemplary example.

The secondary particle diameter ($D_{50}$) of the precursor is measured by the same method as $D_{50}$, which is the 50% cumulative diameter of the lithium metal composite oxide powder.

In the present embodiment, the BET specific surface area of the precursor is preferably adjusted to 5 $m^2/g$ or more and 60 $m^2/g$ or less. When the BET specific surface area of the precursor is controlled, it becomes easy to uniformly form a coating material on the surface of the lithium metal composite oxide powder in the subsequent step of adding a compound containing the element M to the raw material compound and thermally treating the mixture. This makes it possible to control the ratio of the element M eluted into N-methyl-2-pyrrolidone to be within the range of the present embodiment.

As a method for adjusting the BET specific surface area of the precursor to 5 $m^2/g$ or more and 60 $m^2/g$ or less, a method in which the slurry concentration in the reaction vessel is set to 5 mass % or more and 50 mass % or less while controlling the reaction temperature of the reaction vessel to 30° C. or higher and 70° C. or lower is an exemplary example. The BET specific surface area of the precursor is measured by the same method as the BET specific surface area of the lithium metal composite oxide powder.

Lithium Compound

As the lithium compound that is used in the present invention, it is possible to use any one of lithium carbonate, lithium nitrate, lithium acetate, lithium hydroxide, lithium oxide, lithium chloride, and lithium fluoride or a mixture of two or more thereof. Among these, any one or both of lithium hydroxide and lithium carbonate are preferable.

In addition, in a case where lithium hydroxide contains lithium carbonate, the content of lithium carbonate in lithium hydroxide is preferably 5 mass % or less.

The method for mixing the precursor and the lithium compound will be described.

The precursor is dried and then mixed with the lithium compound. The drying conditions are not particularly limited, and, for example, any of the following drying conditions 1) to 3) is an exemplary example.

1) Condition under which precursor is not oxidized or reduced. Specifically, a drying condition under which an oxide remains as an oxide as it is or a drying condition under which a hydroxide remains as a hydroxide as it is.
2) Condition under which precursor is oxidized. Specifically, a drying condition under which a hydroxide is oxidized to an oxide.
3) Condition under which precursor is reduced. Specifically, a drying condition under which an oxide is reduced to a hydroxide.

In order to form the condition under which the precursor is not oxidized or reduced, an inert gas such as nitrogen, helium, or argon may be used, and, in order to form the condition under which a hydroxide is oxidized, oxygen or an air may be used.

In addition, in order to form the condition under which the precursor is reduced, a reducing agent such as hydrazine or sodium sulfite may be used in an inert gas atmosphere.

After dried, the precursor may be appropriately classified.

The above-described lithium compound and precursor are mixed in consideration of the composition ratio of a final target product. For example, the precursor is mixed with the lithium compound such that the ratio of the number of lithium atoms to the number of metal atoms that are contained in the precursor becomes more than 1.0. That is, the lithium compound and the precursor are mixed such that the mole ratio between lithium and the total amount of Ni and the elements X exceeds one.

The ratio of the number of lithium atoms to the number of metal atoms that are included in the precursor is preferably 1.05 or more and more preferably 1.10 or more. The mixture of the precursor and the lithium compound is calcined in the subsequent calcining step (that is, the step of obtaining the raw material compound), thereby obtaining a raw material compound.

In addition, when the mixing ratio of the lithium compound to the precursor is set to 1.0 or more and 1.3 or less, it becomes easy to uniformly form a coating material on the surface of the lithium metal composite oxide powder in the subsequent step of adding a compound containing the element M and thermally treating the mixture. This makes it possible to control the ratio of the element M eluted into N-methyl-2-pyrrolidone to be within the range of the present embodiment.

[Step of Obtaining Raw Material Compound]

The present step is a step of calcining the mixture of the lithium compound and the precursor to obtain a raw material compound.

In the calcining, a dry air, an oxygen atmosphere, an inert atmosphere, or the like is used depending on a desired composition, and a plurality of heating steps is carried out as necessary.

The calcining temperature of the precursor and the above-described lithium compound is not particularly limited, but is, for example, preferably 600° C. or higher and 1100° C. or lower and more preferably 650° C. or higher and 1050° C. or lower.

When the calcining temperature is the above-described lower limit value or higher, it is possible to obtain a lithium metal composite oxide powder having a strong crystal structure. In addition, when the calcining temperature is the above-described upper limit value or lower, it is possible to reduce the volatilization of lithium on the surface of the lithium metal composite oxide powder.

In the present specification, the calcining temperature means the temperature of the atmosphere in a calcining furnace and means the highest temperature of the holding temperatures in a main calcining step (hereinafter, referred to as the highest holding temperature in some cases). In a case of the main calcining step having a plurality of heating steps, the calcining temperature means a temperature at the time of heating the precursor and the liquid compound at the highest holding temperature in each of the heating steps.

The calcining time is preferably three hours or longer and 50 hours or shorter. When the calcining time exceeds 50 hours, there is a tendency that the battery performance substantially deteriorates due to the volatilization of lithium. When the calcining time is shorter than three hours, the development of crystals is poor, and there is a tendency that the battery performance becomes poor. It is also effective to carry out preliminary calcining before the above-described calcining. The temperature of the preliminary calcining is in a range of 300° C. or higher and 850° C. or lower, and the preliminary calcining is preferably carried out for one hour or longer and 10 hours or shorter.

In the present embodiment, the temperature rising rate in the heating step in which the highest holding temperature is reached is preferably 180° C./hour or faster, more preferably 200° C./hour or faster, and particularly preferably 250° C./hour or faster.

The temperature rising rate in the heating step in which the highest holding temperature is reached is calculated from the time taken while the temperature begins to be raised and then reaches a holding temperature to be described below in a calcining device.

The calcining step preferably has a plurality of calcining stages that is carried out at different calcining temperatures. For example, the calcining step preferably has a first calcining stage and a second calcining stage of calcining the precursor and the lithium compound at a higher temperature than in the first calcining stage. Furthermore, the calcining step may have a calcining stage that is carried out at a different calcining temperature for a different calcining time.

When the calcining temperature and the calcining time of the calcining step are controlled, the BET specific surface area, $D_{50}$, which is the 50% cumulative diameter, and the crystallite sizes ($L_A$ and $L_B$) of the lithium metal composite oxide powder can be controlled to be within the ranges of the present embodiment.

As an example, in order to control the BET specific surface area, $D_{50}$, which is the 50% cumulative diameter, and the crystallite sizes ($L_A$ and $L_B$) of the lithium metal composite oxide powder to be within the ranges of the present embodiment, the calcining step preferably has a first calcining stage and a second calcining stage of calcining the precursor and the lithium compound at a higher temperature than in the first calcining stage. In this case, an aspect in which the second calcining stage is carried out at a temperature of 900° C. or higher and 1200° C. or lower for three hours or longer and seven hours or shorter is an exemplary example.

From the viewpoint of making it easy to uniformly form the coating material on the surface of the lithium metal composite oxide powder in the subsequent step of adding a compound containing the element M to the raw material compound and thermally treating the mixture, the calcining temperature is preferably 950° C. or higher and 1015° C. or lower. Such calcining conditions make it possible to control the ratio of the element M eluted into N-methyl-2-pyrrolidone to be within the range of the present embodiment.

[Step of Adding Compound Containing Element M to Raw Material Compound and Thermally Treating Mixture]

As the compound containing the element M, specifically, $H_2SO_4$, $H_2SO_3$, $H_2S_2O_3$, $H_2SO_6$, $H_2SO_8$, $H_3PO_4$, $H_4P_2O_7$, $H_3PO_3$, $H_3PO_2$, $H_3BO_3$, $HBO_2$, $H_2B_4O_7$, $HB_5O_8$, $H_4SiO_4$, $H_2SiO_3$, $H_2SizOs$, $SiO_2$, and the like are exemplary examples.

The amount of the compound containing the element M mixed is not particularly limited, but is, for example, preferably 0.01 mol % or more and 5 mol % or less, more preferably 0.01 mol % or more and 4 mol % or less, and particularly preferably 0.1 mol % or more and 3 mol % or less with respect to the total amount (100 mol %) of the amount of the raw material compound obtained in the above-described step charged. Here, "the total amount of the amount of the raw material compound charged" indicates the total amount of Ni and the element X that are contained in the raw material compound.

When the amount of the compound containing the element M mixed is within the above-described range, it is possible to control the content ratio (M/(Ni+X)) of the element M to the total amount of Ni and the element M that are contained in the lithium metal composite oxide powder and the ratio of the element M eluted into N-methyl-2-pyrrolidone to be within the ranges of the present embodiment.

After the compound containing the element M and the raw material compound are mixed together, the mixture is preferably thermally treated under a dry air having a prepared humidity. The thermal treatment time is in a range of 200° C. or higher and 550° C. or lower, and the thermal treatment is preferably carried out for one hour or longer and 10 hours or shorter. In the present embodiment, the thermal treatment temperature is preferably carried out at a temperature lower than the calcining temperature. The thermal treatment makes it possible to obtain the lithium metal composite oxide powder of the present embodiment. When the thermal treatment temperature is within the above-described range, it is possible to control the ratio of the element M of the lithium metal composite oxide powder eluted into N-methyl-2-pyrrolidone to be within the range of the present embodiment.

In the present embodiment, the thermal treatment step is preferably carried out using a fixed bed-type heat treatment device.

[Random Step]

In the present embodiment, the dried lithium metal composite oxide powder is preferably washed with pure water, an alkaline washing liquid, or the like as a washing liquid.

As the alkaline washing liquid, for example, aqueous solutions of one or more anhydrides selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), and $(NH_4)_2CO_3$ (ammonium carbonate) and aqueous solutions of a hydrate of the above-described anhydride are exemplary examples. In addition, as an alkali, it is also possible to use ammonia.

As a method for bringing the washing liquid and the lithium metal composite oxide powder into contact with each other in the washing step, a method in which the lithium metal composite oxide powder is poured into each washing liquid and stirred or a method in which each washing liquid is applied as shower water to the lithium metal composite oxide powder is an exemplary example. As the method in which each washing liquid is applied as shower water to the lithium metal composite oxide powder, for example, a method in which the lithium metal composite oxide powder is poured into the washing liquid and stirred, then, the lithium metal composite oxide powder is separated from each washing liquid, and then each washing liquid is applied as shower water to the separated lithium metal composite oxide powder is an exemplary example.

The temperature of the washing liquid that is used for the washing is preferably 15° C. or lower, more preferably 10° C. or lower, and still more preferably 8° C. or lower. When the temperature of the washing liquid is controlled in the above-described range to a temperature at which the washing liquid does not freeze, it is possible to suppress the excessive elution of lithium ions from the crystal structure of the lithium metal composite oxide powder into the washing liquid during the washing.

In the present embodiment, the mixture of the lithium compound and the precursor may be calcined in the presence of an inert melting agent.

Calcining of the mixture in the presence of an inert melting agent makes it possible to accelerate the reaction of the mixture. The inert melting agent may remain in the calcined lithium metal composite oxide powder or may be removed by washing the mixture with a washing liquid after the calcining. In the present embodiment, the calcined lithium metal composite oxide powder is preferably washed using pure water or a washing liquid such as an alkaline washing liquid.

In the present embodiment, even in the case of adding the inert melting agent in the mixing step, the calcining temperature and the total time may be appropriately adjusted within the above-described ranges.

The inert melting agent that can be used in the present embodiment is not particularly limited as long as the inert melting agent does not easily react with the mixture during the calcining. In the present embodiment, one or more selected from the group consisting of a fluoride of one or more elements selected from the group consisting of Na, K, Rb, Cs, Ca, Mg, Sr, and Ba (hereinafter, referred to as "A"), a chloride of A, a carbonate of A, a sulfate of A, a nitrate of A, a phosphate of A, a hydroxide of A, a molybdate of A, and A of tungstate are exemplary examples.

As the fluoride of A, NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.), and $BaF_2$ (melting point: 1355° C.) can be exemplary examples.

As the chloride of A, NaCl (melting point: 801° C.), KCl (melting point: 770° C.), RbCl (melting point: 718° C.), CsCl (melting point: 645° C.), $CaCl_2$) (melting point: 782° C.), $MgCl_2$ (melting point: 714° C.), $SrCl_2$ (melting point: 857° C.), and $BaCl_2$ (melting point: 963° C.) can be exemplary examples.

As the carbonate of A, $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.), and $BaCO_3$ (melting point: 1380° C.) can be exemplary examples.

As the sulfate of A, $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.), and $BaSO_4$ (melting point: 1580° C.) can b exemplary examples.

As the nitrate of A, $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.), and $Ba(NO_3)_2$ (melting point: 596° C.) can be exemplary examples.

As the phosphate of A, $Na_3PO_4$, $K_3PO_4$ (melting point: 1340° C.), $Rb_3PO_4$, $Cs_3PO_4$, $Ca_3(PO_4)_2$, $Mg_3(PO_4)_2$, (melting point: 1184° C.), $Sr_3(PO_4)_2$ (melting point: 1727° C.), and $Ba_3(PO_4)_2$ (melting point: 1767° C.) can be exemplary examples.

As the hydroxide of A, NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.), and $Ba(OH)_2$ (melting point: 853° C.) can be exemplary examples.

As the molybdate of A, $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1520° C.), $MgMoO_4$ (melting point: 1060° C.), $SrMoO_4$ (melting point: 1040° C.), and $BaMoO_4$ (melting point: 1460° C.) can be exemplary examples.

As the tungstate of A, $Na_2WO_4$ (melting point: 687° C.), $K_2WO_4$, $Rb_2WO_4$, $Cs_2WO_4$, $CaWO_4$, $MgWO_4$, $SrWO_4$, and $BaWO_4$ can be exemplary examples.

In the present embodiment, it is also possible to use two or more of these inert melting agents. In the case of using two or more inert melting agents, there are also cases where the melting point decreases. In addition, among these inert melting agents, as an inert melting agent for obtaining a lithium metal composite oxide powder having higher crystallinity, any of the carbonate of A, the sulfate of A, and the chloride of A or a combination thereof is preferable. In addition, A is preferably any one or both of sodium (Na) and potassium (K). That is, among the above-described inert melting agents, a particularly preferable inert melting agent is one or more selected from the group consisting of NaOH, KOH, NaCl, KCl, $Na_2CO_3$, $K_2CO_3$, $Na_2SO_4$, and $K_2SO_4$.

In the present embodiment, potassium sulfate or sodium sulfate is preferable as the inert melting agent.

In the present embodiment, even in the case of adding the inert melting agent in the mixing step, the washing may be appropriately adjusted within the above-described ranges.

A lithium metal composite oxide powder obtained by calcining is pulverized, then, appropriately classified, and made into a positive electrode active material for a lithium secondary battery applicable to lithium secondary batteries.

<Lithium Secondary Battery>

Next, the configuration of a lithium secondary battery that is suitable as an application of the positive electrode active material for a lithium secondary battery of the present embodiment will be described.

Furthermore, a positive electrode for a lithium secondary battery that is suitable as an application of the positive electrode active material for a lithium secondary battery of the present embodiment (hereinafter, referred to as positive electrode in some cases) will be described.

Furthermore, a lithium secondary battery that is suitable as an application of the positive electrode will be described.

An example of the lithium secondary battery that is suitable as an application of the positive electrode active material of the present embodiment has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

Figure 1B:
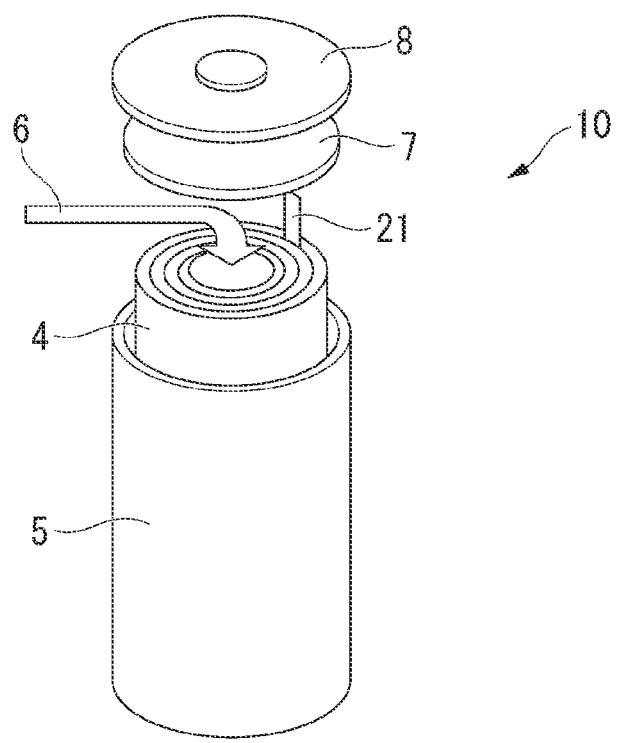
FIG. 1B is a schematic configuration view showing the example of the lithium secondary battery.

FIG. 1A and FIG. 1B are schematic views showing an example of a lithium secondary battery. A cylindrical lithium secondary battery 10 of the present embodiment is produced as described below.

First, as shown in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, as shown in FIG. 1B, the electrode group 4 and an insulator, not shown, are accommodated in a battery can 5, and then the can bottom is sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as a shape of the lithium secondary battery having the electrode group 4, a shape specified by IEC60086, which is a standard for a battery specified by the International Electrotechnical Commission (IEC), or by JIS C 8500 can be adopted. For example, shapes such as a cylindrical type and a square type can be exemplary examples.

Furthermore, the lithium secondary battery is not limited to the winding-type configuration and may be a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.

(Positive Electrode)

The positive electrode can be produced by, first, adjusting a positive electrode mixture containing a positive electrode active material, a conductive material, and a binder and supporting the positive electrode mixture by a positive electrode current collector.

(Conductive Material)

As the conductive material in the positive electrode, a carbon material can be used. As the carbon material, graphite powder, carbon black (for example, acetylene black), a fibrous carbon material, and the like can be exemplary examples. Since carbon black is fine particles and has a large surface area, the addition of a small amount of carbon black to the positive electrode mixture enhances the conductivity inside the positive electrode and is thus capable of improving the charge and discharge efficiency and output characteristics. However, when the carbon black is added too much, both the binding force between the positive electrode mixture and the positive electrode current collector and the binding force inside the positive electrode mixture by the binder decrease, which conversely causes an increase in internal resistance.

The ratio of the conductive material in the positive electrode mixture is preferably 5 parts by mass or more and 20 parts by mass or less with respect to 100 parts by mass of the positive electrode active material. In the case of using a fibrous carbon material such as a graphitized carbon fiber or a carbon nanotube as the conductive material, it is also possible to decrease the ratio thereof.

(Binder)

As the binder in the positive electrode, a thermoplastic resin can be used. As this thermoplastic resin, fluororesins such as polyvinylidene fluoride (hereinafter, referred to as PVdF in some cases), polytetrafluoroethylene (hereinafter, referred to as PTFE in some cases), tetrafluoroethylene-hexafluoropropylene-vinylidene fluoride-based copolymers, hexafluoropropylene-vinylidene fluoride-based copolymers, and tetrafluoroethylene-perfluorovinyl ether-based copolymers; and polyolefin resins such as polyethylene and polypropylene can be exemplary examples.

Two or more of these thermoplastic resins may be used in a mixture form. When a fluororesin and a polyolefin resin are used as the binder, the ratio of the fluororesin in the entire positive electrode mixture is set to 1 mass % or more and 10 mass % or less, and the ratio of the polyolefin resin is set to 0.1 mass % or more and 2 mass % or less, whereby it is possible to obtain a positive electrode mixture having both a high adhesive force to the positive electrode current collector and a high bonding force inside the positive electrode mixture.

As a water-based binder, an aqueous solution obtained by dissolving and dispersing a water-soluble resin, synthetic rubber, or the like in water is an exemplary example.

As the binder, aqueous dispersion of tetrafluoroethylene, styrene-butadiene rubber, carboxymethylcellulose, carboxyethylcellulose, an acrylic resin, fluororubber, an ethylene-propylene-diene monomer ternary copolymer (EPDM), and the like can be exemplary examples.

(Positive Electrode Current Collector)

As the positive electrode current collector in the positive electrode, a strip-shaped member formed of a metal material such as Al, Ni, or stainless steel as a forming material can be used. Among these, from the viewpoint of easy processing and low costs, a positive electrode current collector that contains Al as the forming material and is processed into a thin film shape is preferable.

As a method for supporting the positive electrode mixture by the positive electrode current collector, a method in which the positive electrode mixture is formed by pressurization on the positive electrode current collector is an exemplary example. In addition, the positive electrode mixture may be supported by the positive electrode current collector by preparing a paste of the positive electrode mixture using an organic solvent, applying and drying the paste of the positive electrode mixture to be obtained on at least one surface side of the positive electrode current collector, and fixing the positive electrode mixture by pressing.

As the organic solvent that can be used in the case of preparing the paste of the positive electrode mixture, an amine-based solvent such as N,N-dimethylaminopropylamine or diethylenetriamine; an ether-based solvent such as tetrahydrofuran; a ketone-based solvent such as methyl ethyl ketone; an ester-based solvent such as methyl acetate; and an amide-based solvent such as dimethylacetamide or N-methyl-2-pyrrolidone (hereinafter, referred to as NMP in some cases) are exemplary examples.

As a water-based solvent that can be used in the case of preparing the paste of the positive electrode mixture, aqueous solutions obtained by dissolving a water-dispersible polymer in water are exemplary examples.

As the water-dispersible polymer, one or more polymers selected from the group consisting of methylcellulose, carboxymethylcellulose, ethylcellulose, hydroxyethylcellulose, hydroxypropylmethylcellulose, polyethylene glycol, sodium polyacrylate, polyvinyl alcohol, and polyvinylpyrrolidone can be exemplary examples.

As a method for applying the paste of the positive electrode mixture to the positive electrode current collector, for example, a slit die coating method, a screen coating method, a curtain coating method, a knife coating method, a gravure coating method, and an electrostatic spraying method are exemplary examples.

The positive electrode can be produced by the method exemplified above.

In the positive electrode, a ratio (XA) occupied by $Li_{55\ eV}$ that is calculated by the following equation (A) from a spectrum obtained by measuring a surface of the positive electrode by XPS is preferably 30% or more. XPS is an X-ray photoelectron spectroscopic analyzer.

$$XA = Li_{55\ eV}/(Li_{54\ eV} + Li_{55\ eV}) \times 100 \quad (A)$$

(In the equation (A), $Li_{54\ eV}$ is a peak area of a peak at 54 eV that appears at the time of waveform separation of the spectrum obtained by measuring the surface of the positive electrode by XPS, and $Li_{55\ eV}$ means a peak area of a peak at 55 eV.)

In the present embodiment, the spectrum obtained by measuring the surface of the positive electrode by XPS has a peak top at a binding energy in a range of 53 eV to 57 eV. A peak at 54 eV that appears at the time of the waveform separation of the spectrum in a binding energy range of 53 eV to 57 eV is defined as a peak A, and a peak at 55 eV is defined as a peak B.

It is presumed that the peak A is a peak derived from the positive electrode active material and the peak B is a peak derived from a component that configures the coating material. In the present embodiment, as examples of a compound of the component that configures the coating material, a compound in which lithium, the element M, and oxygen bond to one another, lithium carbonate, and lithium hydroxide are exemplary examples.

$Li_{54\ eV}$: Area of a mountain-shaped portion that is formed between a line connecting the lowest points of the peak A on the right and left sides and the curve of the peak A $Li_{55\ eV}$: Area of a mountain-shaped portion that is formed between a line connecting the lowest points of the peak B on the right and left sides and the curve of the peak B The positive electrode in which the ratio (XA) occupied by $Li_{55\ eV}$ that is calculated by the following equation (A) is 30% or more means that a coating material in which lithium, the element M, and oxygen bond to one another sufficiently remains on the surface of the positive electrode even after kneaded with the slurry-form solvent.

In the present embodiment, the XPS measurement of the positive electrode can be carried out by the following method.

The positive electrode is measured using an X-ray photoelectron spectroscopic analyzer, and the peak intensity of the peak at 54 eV that appears at the time of the waveform separation of the spectrum in a binding energy range of 53 eV to 57 eV and the peak intensity of the peak at 55 eV are measured.

As the X-ray photoelectron spectroscopic analyzer, for example, "K-Alpha" manufactured by Thermo Fisher Scientific Inc. can be used.

An example of measurement conditions will be shown below.

X-ray: AlKα (black and white) 12 kV 6 mA
Spot size: 400 μm
Pass Energy: 50 eV
Neutralization gun charge balance: 0.3 V 100 μA
Step: 0.1 eV
Dwell time: 500 ms
Measuring element: Li1s
Charge correction: Correction at C1s of 284.6 eV (Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone are exemplary examples.

(Negative Electrode Active Material)

As the negative electrode active material in the negative electrode, materials which are a carbon material, a chalcogen compound (oxide, sulfide, or the like), a nitride, a metal, or an alloy and which can be doped with lithium ions and from which lithium ions can be de-doped at a potential lower than that of the positive electrode are exemplary examples.

As the carbon material that can be used as the negative electrode active material, graphite such as natural graphite and artificial graphite, cokes, carbon black, pyrolytic carbons, a carbon fiber, and a calcined product of an organic polymer compound can be exemplary examples.

As the oxide that can be used as the negative electrode active material, oxides of silicon represented by a formula $SiO_x$ (here, x is a positive real number) such as $SiO_2$ and SiO; oxides of titanium represented by a formula $TiO_x$ (here, x is a positive real number) such as $TiO_2$ and TiO; oxides of vanadium represented by a formula $VO_x$ (here, x is a positive real number) such as $V_2O_5$ and $VO_2$; oxides of iron represented by a formula $FeO_x$ (here, x is a positive real number) such as $Fe_3O_4$, $Fe_2O_3$, and FeO; oxides of tin represented by a formula $SnO_x$ (here, x is a positive real number) such as $SnO_2$ and SnO; oxides of tungsten represented by a general formula $WO_x$ (here, x is a positive real number) such as $WO_3$ and $WO_2$; and metal composite oxides containing lithium and titanium or vanadium such as $Li_4Ti_5O_{12}$ and $LiVO_2$ can be exemplary examples.

As the sulfide that can be used as the negative electrode active material, sulfides of titanium represented by a formula $TiS_x$ (here, x is a positive real number) such as $Ti_2S_3$, $TiS_2$, and TiS; sulfides of vanadium represented by a formula $VS_x$ (here, x is a positive real number) such as $V_3S_4$, $VS_2$, and VS; sulfides of iron represented by a formula $FeS_x$ (here, x is a positive real number) such as $Fe_3S_4$, $FeS_2$, and FeS; sulfides of molybdenum represented by a formula $MoS_x$ (here, x is a positive real number) such as $Mo_2S_3$ and $MoS_2$; sulfides of tin represented by a formula $SnS_x$ (here, x is a positive real number) such as $SnS_2$ and SnS; sulfides of tungsten represented by a formula $WS_x$ (here, x is a positive real number) such as $WS_2$; sulfides of antimony represented by a formula $SbS_x$ (here, x is a positive real number) such as $Sb_2S_3$; and sulfides of selenium represented by a formula $SeS_x$ (here, x is a positive real number) such as $Se_5S_3$, $SeS_2$, and SeS can be exemplary examples.

As the nitride that can be used as the negative electrode active material, lithium-containing nitrides such as $Li_3N$ and $Li_{3-x}A_xN$ (here, A is any one or both of Ni and Co, and $0<x<3$) can be exemplary examples.

These carbon materials, oxides, sulfides, and nitrides may be used singly or two or more thereof may be jointly used. In addition, these carbon materials, oxides, sulfides, and nitrides may be crystalline or amorphous.

In addition, as the metal that can be used as the negative electrode active material, lithium metal, silicon metal, tin metal, and the like can be exemplary examples.

As the alloy that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can also be exemplary examples.

These metals and alloys are used mainly singly as an electrode after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from a uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, a thermoplastic resin and synthetic rubber can be an exemplary example, and specifically, PVdF, thermoplastic polyimide, carboxymethylcellulose, styrene-butadiene rubber, polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example. Particularly, a negative electrode current collector that is formed of Cu as a forming material and processed into a thin film shape is preferable since the negative electrode current collector does not easily produce an alloy with lithium and is easy to process.

As a method for supporting the negative electrode mixture by the negative electrode current collector, similar to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials.

The separator is preferably a laminate film in which a heat-resistant porous layer and a porous film are laminated.

In the present embodiment, the air resistance of the separator by the Gurley method specified by JIS P 8117 is preferably 50 sec/100 cc or more and 300 sec/100 cc or less and more preferably 50 sec/100 cc or more and 200 sec/100 cc or less in order to favorably transmit the electrolyte while the battery is in use (while the battery is being charged and discharged).

In addition, the porosity of the separator is preferably 30 vol % or more and 80 vol % or less and more preferably 40 vol % or more and 70 vol % or less. The separator may be a laminate of separators having different porosities.

(Electrolytic Solution)

The electrolytic solution in the lithium secondary battery contains an electrolyte and an organic solvent.

As the electrolyte that is contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)$ $COCF_3$), $Li(C_4F_9SO_3)$, $LiC(SO_2CF_3)_3$, $Li_2B_{10}Cl_{10}$, LiBOB (here, BOB represents bis(oxalato) borate), LiFSI (here, FSI represents bis(fluorosulfonyl)imide), lower aliphatic carboxylic acid lithium salts, and $LiAlCl_4$ are exemplary examples, and a mixture of two or more thereof may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

In addition, as the organic solvent that is contained in the electrolytic solution, it is possible to use, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di (methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or these organic solvents into which a fluoro group is further introduced (the organic solvents in which one or more hydrogen atoms in the organic solvent are substituted with a fluorine atom).

As the organic solvent, two or more of the above-described organic solvents are preferably used in a mixture form. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. The electrolytic solution for which such a mixed solvent is used has a number of features as follows: the electrolytic solution has a broad operating temperature range, does not easily deteriorate even when the lithium secondary battery is charged and discharged at a high current rate, does not easily deteriorate even after used for a long period of time, and does not easily dissolve even in a case where a graphite material such as natural graphite or artificial graphite is used as an active material for the negative electrode.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing an ether having a fluorine substituent such as pentafluoropropyl methyl ether or 2,2,3,3-tetrafluoropropyl difluoromethyl ether and dimethyl carbonate is still more preferable since the capacity retention rate is high even when the lithium secondary battery is charged and discharged at a high current rate.

A solid electrolyte, which will be described below, may be used instead of the above-described electrolytic solution.

In addition, in a case where the solid electrolyte is used in the lithium secondary battery, there are also cases where the solid electrolyte plays a role of the separator, and in such cases, the separator is not required in some cases.

In the positive electrode active material having the above-described configuration, since a lithium metal composite oxide powder that is produced by the above-described present embodiment is used, it is possible to suppress metal elution in lithium secondary batteries.

In addition, since the positive electrode having the above-described configuration has the positive electrode active material for a lithium secondary battery having the above-described configuration, it is possible to suppress metal elution in lithium secondary batteries.

Furthermore, a lithium secondary battery having the above-described configuration has the above-described positive electrode and thus becomes a secondary battery in which metal elution is suppressed.

<All-Solid-State Lithium Secondary Battery>

Next, a positive electrode for which a positive electrode active material for a lithium metal composite oxide powder according to an aspect of the present invention is used as a positive electrode active material for an all-solid-state lithium secondary battery and an all-solid-state lithium secondary battery having this positive electrode will be described while describing the configuration of the all-solid-state lithium secondary battery.

Figure 2:
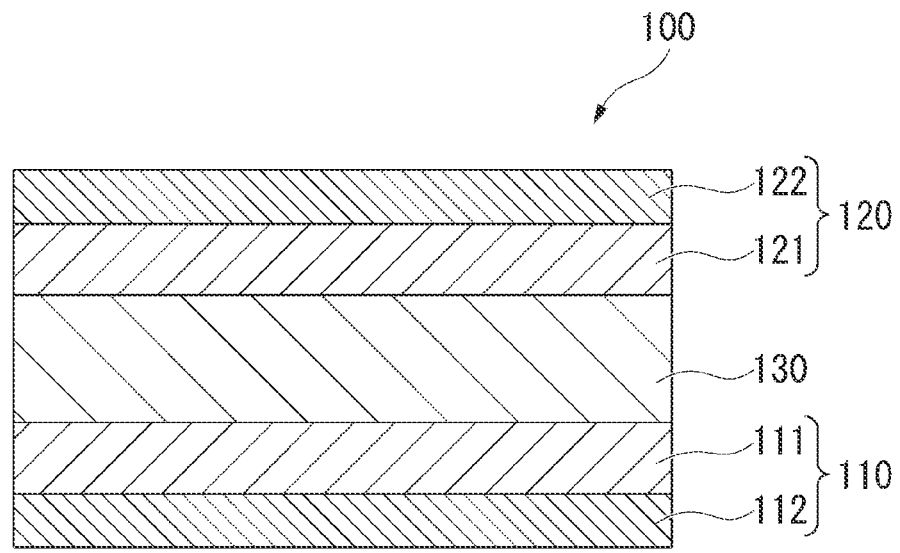
FIG. 2 is a schematic view showing a laminate that an all-solid-state lithium secondary battery of the present embodiment includes.
Figure 3:
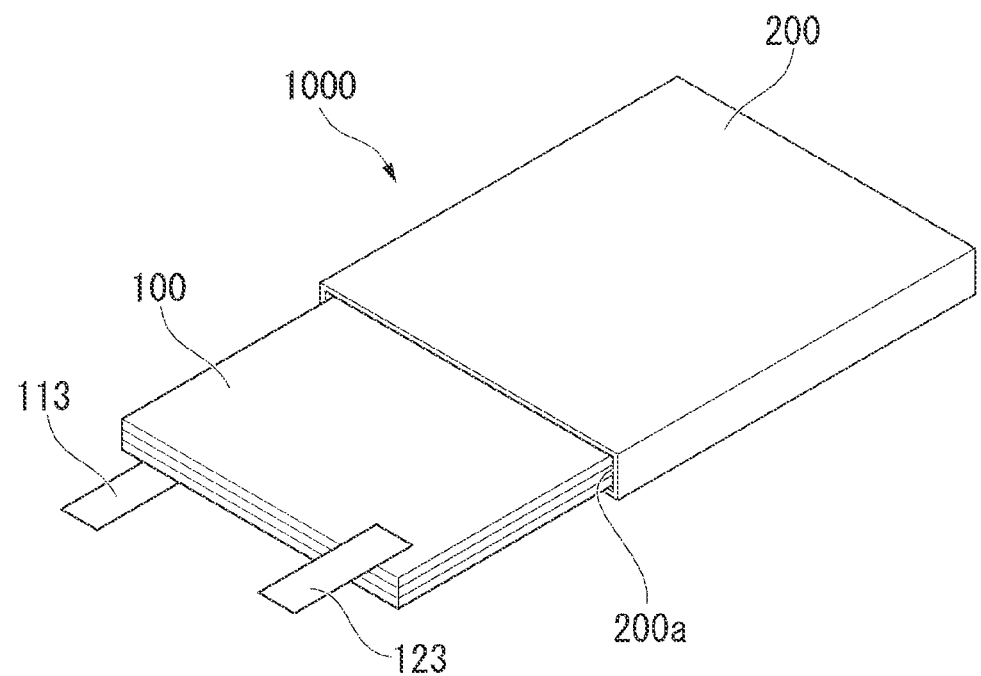
FIG. 3 is a schematic view showing an entire configuration of the all-solid-state lithium secondary battery of the present embodiment.

FIG. 2 and FIG. 3 are schematic views showing an example of an all-solid-state lithium secondary battery of the present embodiment. An all-solid-state secondary battery 1000 shown in FIG. 2 and FIG. 3 has a laminate 100 having a positive electrode 110, a negative electrode 120, and a solid electrolyte layer 130 and an exterior body 200 accommodating the laminate 100. A material that configures each member will be described below.

The laminate 100 may have an external terminal 113 that is connected to a positive electrode current collector 112 and an external terminal 123 that is connected to a negative electrode current collector 122. In addition, the all-solid-state secondary battery 1000 may have a separator between the positive electrode 110 and the negative electrode 120.

The all-solid-state secondary battery 1000 further has an insulator, not shown, that insulates the laminate 100 and the exterior body 200 from each other and a sealant, not shown, that seals an opening portion 200a of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been carried out into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state secondary battery 1000, a form in which one laminate 100 is provided is shown in the drawings, but the present embodiment is not limited thereto. The all-solid-state secondary battery 1000 may have a configuration in which the laminate 100 is used as a unit cell and a plurality of unit cells (laminates 100) is sealed inside the exterior body 200.

Hereinafter, each configuration will be described in order.
(Positive Electrode)

The positive electrode 110 of the present embodiment has a positive electrode active material layer 111 and a positive electrode current collector 112.

The positive electrode active material layer 111 contains the positive electrode active material, which is one aspect of the present invention described above, and a solid electrolyte. In addition, the positive electrode active material layer 111 may contain a conductive material and a binder.
(Solid Electrolyte)

As the solid electrolyte that is contained in the positive electrode active material layer 111 of the present embodiment, a solid electrolyte that is lithium ion-conductive and used in well-known all-solid-state batteries can be adopted. As the solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes are exemplary examples.
(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples.

As the perovskite-type oxide, Li—La—Ti-based oxides such as $Li_aLa_{1-a}TiO_3$ (0<a<1), Li—La—Ta-based oxides such as $Li_bLa_{1-b}TaO_3$ (0<b<1), Li—La—Nb-based oxides such as $Li_cLa_{1-c}NbO_3$ (0<c<1), and the like are exemplary examples.

As the NASICON-type oxide, $Li_{1+d}Al_dTi_{2-d}(PO_4)_3$ (0≤d≤1) and the like are exemplary examples. The NASICON-type oxide is an oxide represented by $Li_eM^1_fM^2_gP_hO_i$ (in the formula, $M^1$ is one or more elements selected from the group consisting of B, Al, Ga, In, C, Si, Ge, Sn, Sb, and Se. $M^2$ is one or more elements selected from the group consisting of Ti, Zr, Ge, In, Ga, Sn, and Al. e, f, g, h, and i are random positive numbers).

As the LISICON-type oxide, oxides represented by $Li_4M^3O_4$—$Li_3M^4O_4$ ($M^3$ is one or more elements selected from the group consisting of Si, Ge, and Ti. $M^4$ is one or more elements selected from the group consisting of P, As, and V) and the like are exemplary examples.

As the garnet-type oxide, Li—La—Zr-based oxides such as $Li_7La_3Zr_2O_{12}$ (also referred to as LLZ) are exemplary examples.

The oxide-based solid electrolyte may be a crystalline material or an amorphous material.

(Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, $Li_2S$—$P_2S_3$-based compounds, LiI—$Si_2S$—$P_2S_5$, LiI—$Li_2S$—$P_2O_5$, LiI—$Li_3PO_4$—$P_2S_5$, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The ratio of $Li_2S$ that is contained in the $Li_2S$—$P_2S_5$-based compound is, for example, 50 to 90 mass % with respect to the entire $Li_2S$—$P_2S_5$-based compound. The ratio of $P_2S_5$ that is contained in the $Li_2S$—$P_2S_5$-based compound is, for example, 10 to 50 mass % with respect to the entire $Li_2S$—$P_2S_5$-based compound. In addition, the ratio of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds, $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$P_2S_5$—$Z_mS_n$ (m and n are positive numbers. Z is Ge, Zn, or Ga.), and the like are exemplary examples.

As the $Li_2S$—$SiS_2$-based compounds, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$Li_3PO_4$, $Li_2S$—$SiS_2$—$Li_2SO_4$, $Li_2S$—$SiS_2$—$Li_xMO_y$, (x and y are positive numbers. M is P, Si, Ge, B, Al, Ga, or In.), and the like are exemplary examples.

As the $Li_2S$—$GeS_2$-based compounds, include $Li_2S$—$GeS_2$, $Li_2S$—$GeS_2$—$P_2S_5$, and the like are exemplary examples.

The sulfide-based solid electrolyte may be a crystalline material or an amorphous material.

(Hydride-Based Solid Electrolyte)

As the hydride-based solid electrolyte material, $LiBH_4$, $LiBH_4$-3KI, $LiBH_4$—$PI_2$, $LiBH_4$—$P_2S_5$, $LiBH_4$—$LiNH_2$, $3LiBH_4$—LiI, $LiNH_2$, $Li_2AlH_6$, $Li(NH_2)_2I$, $Li_2NH$, $LiGd(BH_4)_3Cl$, $Li_2(BH_4)(NH_2)$, $Li_3(NH_2)I$, $Li_4(BH_4)(NH_2)_3$, and the like can be exemplary examples.

(Polymer-Based Solid Electrolyte)

As the polymer-based solid electrolyte, for example, organic polymer electrolytes such as polymer compounds containing one or more selected from the group consisting of a polyethylene oxide-based polymer compound, a polyorganosiloxane chain, and a polyoxyalkylene chain can be exemplary examples. In addition, it is also possible to use a so-called gel-type solid electrolyte in which a non-aqueous electrolytic solution is held in the polymer compound.

Two or more solid electrolytes can be jointly used as long as the effect of the invention is not impaired.

(Conductive Material)

As the conductive material in the positive electrode active material layer 111 of the present embodiment, at least one of a carbon material and a metal compound can be used. As the carbon material, graphite powder, carbon black (for example, acetylene black), a fibrous carbon material, and the like can be exemplary examples. Since carbon black is fine particles and has a large surface area, the addition of carbon black in an appropriate amount, which will be described below, to the positive electrode active material layer 111 makes it possible to enhance the conductivity inside the positive electrode 110 and to improve the charge and discharge efficiency and output characteristics. On the other hand, when the amount of carbon black added is too large, both the binding force between the positive electrode active material layer 111 and the positive electrode current collector 112 and the binding force inside the positive electrode active material layer 111 decrease, which conversely causes an increase in internal resistance. In addition, as the metal compound, metals, metal alloys, and metal oxides, all of which are electrically conductive, are exemplary examples.

In the case of the carbon material, the ratio of the conductive material in the positive electrode active material layer 111 is preferably 5 parts by mass or more and 20 parts by mass or less with respect to 100 parts by mass of the positive electrode active material. In the case of using a fibrous carbon material such as a graphitized carbon fiber or a carbon nanotube as the conductive material, it is also possible to decrease the ratio thereof.

(Binder)

In a case where the positive electrode active material layer 111 has a binder, a thermoplastic resin can be used as the binder. As this thermoplastic resin, polyimide-based resins; fluororesins such as polyvinylidene fluoride (hereinafter, referred to as PVdF in some cases), polytetrafluoroethylene (hereinafter, referred to as PTFE in some cases), tetrafluoroethylene-hexafluoropropylene-vinylidene fluoride-based copolymers, hexafluoropropylene-vinylidene fluoride-based copolymers, and tetrafluoroethylene-perfluorovinyl ether-based copolymers; and polyolefin resins such as polyethylene and polypropylene can be exemplary examples.

Two or more of these thermoplastic resins may be used in a mixture form. When a fluororesin and a polyolefin resin are used as the binder, the ratio of the fluororesin in the entire positive electrode active material layer 111 is set to 1 mass % or more and 10 mass % or less, and the ratio of the polyolefin resin is set to 0.1 mass % or more and 2 mass % or less, the positive electrode active material layer 111 has both a high adhesive force between the positive electrode active material layer 111 and the positive electrode current collector 112 and a high bonding force inside the positive electrode active material layer 111.

(Positive Electrode Current Collector)

As the positive electrode current collector 112 in the positive electrode 110 of the present embodiment, a strip-shaped member formed of a metal material such as Al, Ni, or stainless steel as a forming material can be used. Among these, from the viewpoint of easy processing and low costs, a member that contains Al as the forming material and is processed into a thin film shape is preferable.

As a method for supporting the positive electrode active material layer 111 by the positive electrode current collector 112, a method in which the positive electrode active material layer 111 is formed by pressurization on the positive electrode current collector 112 is an exemplary example. A cold press or a hot press can be used to form the positive electrode active material layer 111 by pressurization.

In addition, the positive electrode active material layer 111 may be supported by the positive electrode current collector 112 by preparing a paste of a mixture of the positive electrode active material, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of the positive electrode active material, the solid electrolyte, and the conductive material using an organic solvent to produce a positive electrode mixture, applying and drying the positive electrode mixture to be obtained on at least one surface of the positive electrode current collector 112, and calcining the positive electrode mixture.

As the organic solvent that can be used in the positive electrode mixture, amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide and N-methyl-2-pyrrolidone (hereinafter, referred to as NMP in some cases) are exemplary examples.

As a method for applying the positive electrode mixture to the positive electrode current collector 112, for example, a slit die coating method, a screen coating method, a curtain coating method, a knife coating method, a gravure coating method, and an electrostatic spraying method are exemplary examples.

The positive electrode 110 can be produced by the method exemplified above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the solid electrolyte, the conductive material, and a binder, those described above can be used.

(Negative Electrode Active Material)

As the negative electrode active material in the negative electrode active material layer 121, materials which are a carbon material, a chalcogen compound (oxide, sulfide, or the like), a nitride, a metal, or an alloy and which can be doped with lithium ions and from which lithium ions can be de-doped at a potential lower than that of the positive electrode 110 are exemplary examples.

As the carbon material that can be used as the negative electrode active material, graphite such as natural graphite and artificial graphite, cokes, carbon black, pyrolytic carbons, a carbon fiber, and a calcined product of an organic polymer compound can be exemplary examples.

As the oxide that can be used as the negative electrode active material, oxides of silicon represented by a formula $SiO_x$ (here, x is a positive real number) such as $SiO_2$ and SiO; oxides of titanium represented by a formula $TiO_x$ (here, x is a positive real number) such as $TiO_2$ and TiO; oxides of vanadium represented by a formula $VO_x$ (here, x is a positive real number) such as $V_2O_5$ and $VO_2$; oxides of iron represented by a formula $FeO_x$ (here, x is a positive real number) such as $Fe_3O_4$, $Fe_2O_3$, and FeO; oxides of tin represented by a formula $SnO_x$ (here, x is a positive real number) such as $SnO_2$ and SnO; oxides of tungsten represented by a general formula $WO_x$ (here, x is a positive real number) such as $WO_3$ and $WO_2$; and metal composite oxides containing lithium and titanium or vanadium such as $Li_4Ti_5O_{12}$ and $LiVO_2$ can be exemplary examples.

As the sulfide that can be used as the negative electrode active material, sulfides of titanium represented by a formula $TiS_x$ (here, x is a positive real number) such as $Ti_2S_3$, $TiS_2$, and TiS; sulfides of vanadium represented by a formula $VS_x$ (here, x is a positive real number) such $V_3S_4$, $VS_2$, and VS; sulfides of iron represented by a formula $FeS_x$ (here, x is a positive real number) such as $Fe_3S_4$, $FeS_2$, and FeS; sulfides of molybdenum represented by a formula $MoS_x$ (here, x is a positive real number) such as $Mo_2S_3$ and $MoS_2$; sulfides of tin represented by a formula $SnS_x$ (here, x is a positive real number) such as $SnS_2$ and SnS; sulfides of tungsten represented by a formula $WS_x$ (here, x is a positive real number) such as $WS_2$; sulfides of antimony represented by a formula $SbS_x$ (here, x is a positive real number) such as $Sb_2S_3$; and sulfides of selenium represented by a formula $SeS_x$ (here, x is a positive real number) such as $SeS_3$, $SeS_2$, and SeS can be exemplary examples.

As the nitride that can be used as the negative electrode active material, lithium-containing nitrides such as $Li_3N$ and $Li_{3-x}A_xN$ (here, A is any one or both of Ni and Co, and 0<x<3) can be exemplary examples.

These carbon materials, oxides, sulfides, and nitrides may be used singly or two or more thereof may be jointly used. In addition, these carbon materials, oxides, sulfides, and nitrides may be crystalline or amorphous.

In addition, as the metal that can be used as the negative electrode active material, lithium metal, silicon metal, tin metal, and the like can be exemplary examples.

As the alloy that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can also be exemplary examples.

These metals and alloys are used mainly singly as an electrode after being processed into, for example, a foil shape.

Among the above-described negative electrode active materials, the carbon material containing graphite such as natural graphite or artificial graphite as a main component is preferably used for the reason that the potential of the negative electrode 120 rarely changes (that is, the potential flatness is favorable) from a uncharged state to a fully-charged state during charging, the average discharging potential is low, the capacity retention rate at the time of repeatedly charging and discharging the lithium secondary battery is high (that is, the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

In addition, among the above-described negative electrode active materials, the oxides are preferably used since the thermal stability is high and dendrites (also referred to as dendritic crystals) are not easily generated by Li metal. As the shape of the oxide, a fibrous or fine powder aggregate is preferably used.

(Negative Electrode Current Collector)

As the negative electrode current collector 122 in the negative electrode 120, a strip-shaped member formed of a metal material such as Cu, Ni, or stainless steel as the forming material can be an exemplary example. Particularly, a member that is formed of Cu as a forming material and processed into a thin film shape is preferable since the negative electrode current collector does not easily produce an alloy with lithium and is easy to process.

As a method for supporting the negative electrode active material layer 121 by the negative electrode current collector 122, similar to the case of the positive electrode 110, a method in which the negative electrode active material layer 121 is formed by pressurization, a method in which a paste-form negative electrode mixture containing a negative electrode active material is applied and dried on the negative electrode current collector 122 and then the negative electrode active material layer 121 is compressed by pressing, and a method in which a paste-form negative electrode mixture containing a negative electrode active material is applied, dried and then calcined on the negative electrode current collector 122 are exemplary examples.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method such that the negative electrode electrolyte layer 121 comes into contact with the surface of the solid electrolyte layer 130.

Another aspect of the present invention includes the following inventions.

[13] A lithium metal composite oxide powder having a layered structure, containing at least Li, Ni, an element X, and an element M, in which the element X is one or more elements selected from the group consisting of Co, Mn, Fe, Cu, Ti, Mg, Al, W, Mo, Nb, Zn, Sn, Zr, Ga, and V, the element M is one or more elements selected from the group consisting of B, Si, S, and P, M/(Ni+X) that is a content ratio of the element M to a total amount of Ni and the element X that are contained in the lithium metal composite oxide powder is 0.01 mol % or more and 5 mol % or less, Ni/(Ni+X) that is a content ratio of Ni to the total amount of Ni and the element X that are contained in the lithium metal composite oxide powder satisfies 0.40 or more in terms of a mole ratio, core particles containing at least Li, Ni, and the element X and a coating material that coats surfaces of the core particles are provided, the coating material contains the element M, and a ratio of the element M eluted into N-methyl-2-pyrrolidone measured under the following measurement conditions is 0.09 or less.

(Measurement Conditions)

1 g of the lithium metal composite oxide powder is precisely weighed and immersed in N-methyl-2-pyrrolidone precisely weighed to 3.5 g, thereby preparing a measurement sample. The measurement sample is put into a closed container and left at room temperature of 25° C. for 96 hours.

After that, the measurement sample is centrifuged at 3000 rpm for 10 minutes.

After the centrifugation, 100 μL of a supernatant is collected, and the content ratio of the element M that is contained in 100 μL of the supernatant is measured.

The ratio of the element M eluted into N-methyl-2-pyrrolidone is calculated by the following equation.

Ratio of element M eluted into N-methyl-2-pyrrolidone=(amount of element M eluted into N-methyl-2-pyrrolidone)/(amount of element M in lithium metal composite oxide powder before immersed in N-methyl-2-pyrrolidone)

[14] The lithium metal composite oxide powder according to [13], in which the element M is boron.

[15] The lithium metal composite oxide powder according to or [14], in which a BET specific surface area is more than 0.30 m$^2$/g and less than 0.80 m$^2$/g.

[16] The lithium metal composite oxide powder according to any one of to [15], in which a 50% cumulative diameter ($D_{50}$) obtained from a particle size distribution measurement value is 4.1 μm or more and 10.0 μm or less.

[17] The lithium metal composite oxide powder according to any one of to [16], in which, in powder X-ray diffraction measurement using a CuKα ray, a crystallite size in a peak within a range of 2θ=18.7±1° is more than 840 Å.

[18] The lithium metal composite oxide powder according to any one of to [17], in which the ratio of the element M eluted into N-methyl-2-pyrrolidone is more than 0.001 and 0.04 or less.

[19] The lithium metal composite oxide powder according to any one of to [18], in which, when a positive electrode for a lithium secondary battery in which a mass ratio of the lithium metal composite oxide powder, acetylene black, and PVdF is 92:5:3 (lithium metal composite oxide powder:acetylene black:PVdF) and an electrode area is 34.96 cm$^2$ is formed, a single-layer laminate cell including the positive electrode for a lithium secondary battery, a separator of a polypropylene porous film, an electrolytic solution obtained by dissolving LiPF$_6$ in a liquid mixture of ethylene carbonate, dimethyl carbonate, and ethyl methyl carbonate in a volume ratio of 16:10:74 to reach 1.3 mol/l, and a negative electrode for a lithium secondary battery containing artificial graphite is produced, and an amount of Ni eluted per a positive electrode active material to be obtained is 11 μg/g or less at the time of measuring the amount of Ni eluted per positive electrode active material as described below in a test of the single-layer laminate cell under conditions described below.

Testing Conditions

The obtained laminate cell is subjected to formation under the following conditions, then, charged up to 4.3 V, and stored in a constant temperature vessel at 60° C. for seven days.

Formation conditions: The laminate cell is charged up to a SOC of 10% at 0.05 CA at a testing temperature of 25° C., left at a testing temperature of 60° C. for 10 hours, and then CC-CV-charged up to 4.3 V at 0.1 CA at a testing temperature of 25° C. until the current reaches 0.05 CA. Furthermore, the laminate cell is discharged up to 2.5 V at 0.2 CA and charged and discharged at 0.2 CA two cycles.

The laminate cell discharged up to 2.5 V at a current value of 0.2 CA after stored is disassembled in a glove box under an Ar atmosphere, the negative electrode is removed, and the laminate cell is left for one hour to volatilize the electrolytic solution. From the negative electrode removed from the glove box, 100 mg of the negative electrode mixture is scraped off with a TEFLON (registered trademark) rod, put into 8 ml of concentrated nitric acid, irradiated with microwave irradiation at 1000 W for 42 minutes, heated, and extracted, and 100 μL of a supernatant is collected with a micropipette, and the content ratio of Ni that is contained in the supernatant is measured with an ICP emission spectrometer.

The content ratio of Ni in the negative electrode mixture is measured by the above-described measurement. The content ratio of Ni in the negative electrode mixture is multiplied by the weight of the negative electrode mixture that is contained in the laminate cell and divided by the weight of the lithium metal composite oxide powder that is contained in the laminate cell, thereby calculating the amount of Ni eluted per amount of the lithium metal composite oxide powder.

[20] A positive electrode active material for a lithium secondary battery, containing the lithium metal composite oxide powder according to any one of to [19].

Furthermore, as the aspect of the present invention, the following aspects are exemplary examples.

[21] A positive electrode having the positive electrode active material for a lithium secondary battery according to [20].

[22] A lithium secondary battery having the positive electrode for a lithium secondary battery according to [21].

[24] The lithium secondary battery according to [23], further having a separator.

[25] The lithium secondary battery according to [24], in which the separator is a separator made of a laminate film in which a heat-resistant porous layer and a porous film are laminated.

EXAMPLES

Next, the present invention will be described in more detail using examples.

<Composition Analysis>

The composition analysis of a lithium metal composite oxide powder that was produced by a method, which will be described below, was carried out using an ICP emission spectrometer (SPS3000, manufactured by Seiko Instruments Inc.) after the obtained lithium metal composite oxide powder was dissolved in hydrochloric acid.

<Measurement of BET Specific Surface Area>

The BET specific surface area was measured using Macsorb (registered trademark) manufactured by MOUNTECH Co., Ltd. after drying 1 g of the lithium metal composite oxide powder in a nitrogen atmosphere at 105° C. for 30 minutes.

<Measurement of Particle Size Distribution of Lithium Metal Composite Oxide Powder>

0.1 g of the lithium metal composite oxide powder to be measured was put into 50 ml of 0.2 mass % sodium hexametaphosphate aqueous solution to obtain a dispersion liquid in which the powder was dispersed. The particle size distribution of the obtained dispersion liquid was measured using a MASTERSIZER 2000 manufactured by Malvern Panalytical Ltd. (laser diffraction scattering particle size distribution measuring device) to obtain a volume-based cumulative particle size distribution curve. In the obtained cumulative particle size distribution curve, the volume particle size at the time of 50% accumulation is defined as the 50% cumulative volume particle size $D_{50}$ of the lithium metal composite oxide powder.

<Measurement of Crystallite Size>

A powder X-ray diffraction pattern for Rietveld analysis of the lithium metal composite oxide powder was acquired by powder X-ray diffraction measurement using CuKα ray by using D8 Advance, which is an XRD device manufactured by Bruker. From the acquired X-ray diffraction pattern, analysis was carried out by using TOPASD8, which is a powder X-ray analysis software manufactured by Bruker in consideration of parameters specific to the apparatus D8 Advance. From the crystallite size ($L_A$) calculated from a diffraction peak within a range of 2θ=18.7±1° obtained by the analysis and the crystallite size ($L_B$) calculated from a diffraction peak within a range of 2θ=44.6±1°, the ratio ($L_A/L_B$) of $L_A$ to $L_B$ was calculated.

<Measurement of Amount of Residual Lithium>

20 g of the lithium metal composite oxide powder and 100 g of pure water were put into a 100 ml beaker and stirred for five minutes. After stirring, the lithium metal composite oxide powder was filtered, 0.1 mol/L of hydrochloric acid was added dropwise to 60 g of the remaining filtrate, and the pH of the filtrate was measured with a pH meter. The amount of hydrochloric acid added for titration at pH=8.3±0.1 was indicated by A ml, the amount of hydrochloric acid added for titration at pH=4.5±0.1 was indicated by B ml, and the amount of lithium carbonate and the amount of lithium hydroxide that remained in the lithium metal composite oxide powder were calculated from the following calculation equation. In the following equation, the molecular weights of lithium carbonate and lithium hydroxide were calculated with an assumption that the individual atomic weights are H: 1.000, Li: 6.941, C: 12.000, and O: 16.000.

$$\text{Amount of lithium carbonate (mass \%)} = \{0.1 \times (B-A)/1000\} \times \{73.882/(20 \times 60/100)\} \times 100$$

$$\text{Amount of lithium hydroxide (mass \%)} = \{0.1 \times (2A-B)/1000\} \times \{23.941/(20 \times 60/100)\} \times 100$$

<Measurement of Ratio of Boron Eluted into N-Methyl-2-Pyrrolidone>

(Measurement Conditions)

1 g of the lithium metal composite oxide powder was precisely weighed and immersed in N-methyl-2-pyrrolidone precisely weighed to 3.5 g, thereby preparing a measurement sample. The measurement sample was put into a closed container and left at room temperature of 25° C. for 96 hours.

After that, the measurement sample was centrifuged at 3000 rpm for 10 minutes.

After the centrifugation, 100 μL of a supernatant was collected, and the content ratio of boron that was contained in 100 μL of the supernatant was measured with an ICP emission spectrometer (device name: ELAN DRCII, manufacturer name: PerkinElmer Co., Ltd.).

From the content ratio of boron that was contained in 100 μL of the supernatant, the amount of boron eluted into N-methyl-2-pyrrolidone was calculated by the following method.

Amount of boron eluted into N-methyl-2-pyrrolidone=3.5 (g)×content ratio of boron contained in 100 μL of supernatant (ppm)

Furthermore, the amount of boron in the lithium metal composite oxide powder before being immersed in N-methyl-2-pyrrolidone was calculated by the following method.

Amount of boron in lithium metal composite oxide powder before being immersed in N-methyl-2-pyrrolidone After the lithium metal composite oxide powder was dissolved in hydrochloric acid, the content ratio (ppm) of boron was measured using an ICP emission spectrometer (for example, SPS3000 manufactured by Seiko Instruments Inc.). A value obtained by multiplying the measurement value by one becomes the amount of boron that is contained in 1 g of the lithium metal composite oxide powder.

The ratio of boron eluted into N-methyl-2-pyrrolidone was calculated by the following equation from the values obtained above.

Ratio of boron eluted into N-methyl-2-pyrrolidone= (amount of boron eluted into N-methyl-2-pyrrolidone)/ (amount of boron in lithium metal composite oxide powder before immersed in N-methyl-2-pyrrolidone)

<Measurement of Amount of Ni Eluted>

A single-layer laminate cell was produced using a positive electrode produced by a method described below, the obtained negative electrode (artificial graphite), a separator (made of polypropylene (thickness: 25 μm)), and an electrolytic solution (obtained by dissolving $LiPF_6$ in a liquid mixture of ethylene carbonate, dimethyl carbonate, and ethyl methyl carbonate at a volume ratio of 16:10:74 to reach 1.3 mol/L.

The laminate cell was subjected to formation under the following conditions, then, charged up to 4.3 V, and stored in a constant temperature vessel at 60° C. for seven days.

Formation conditions: The laminate cell was charged up to a SOC of 10% at 0.05 CA at a testing temperature of 25° C., left at a testing temperature of 60° C. for 10 hours, and then CC-CV-charged up to 4.3 V at 0.1 CA at a testing temperature of 25° C. until the current reached 0.05 CA. Furthermore, the laminate cell was discharged up to 2.5 V at 0.2 CA and charged and discharged at 0.2 CA two cycles.

The laminate cell discharged up to 2.5 V at a current value of 0.2 CA after stored was disassembled in a glove box under an Ar atmosphere, the negative electrode was removed, and the laminate cell was left for one hour to volatilize the electrolytic solution. From the negative electrode removed from the glove box, 100 mg of the negative electrode mixture was scraped off with a TEFLON (registered trademark) rod, put into 8 ml of concentrated nitric acid, irradiated with microwave irradiation at 1000 W for 42 minutes, heated, and extracted, and 100 μL of a supernatant was collected with a micropipette, and the content ratio of Ni that was contained in the supernatant was measured with an ICP emission spectrometer (device name: ELAN DRCII, manufacturer name: PerkinElmer Co., Ltd.).

The content ratio of Ni in the negative electrode mixture is measured by the above-described measurement. The content ratio of Ni in the negative electrode mixture was multiplied by the weight of the negative electrode mixture that was contained in the laminate cell and divided by the weight of the lithium metal composite oxide powder that was contained in the laminate cell, thereby calculating the amount of Ni eluted per amount of the lithium metal composite oxide powder.

<Production of Positive Electrode for Lithium Secondary Battery>

A paste-form positive electrode mixture was prepared by adding the lithium metal composite oxide powder obtained by the production method described below, a conductive material (acetylene black), and a binder (PVdF) to achieve a composition of the lithium metal composite oxide powder: conductive material:binder=92:5:3 (mass ratio) and carrying out kneading thereon. During the preparation of the positive electrode mixture, N-methyl-2-pyrrolidone was used as an organic solvent.

The obtained positive electrode mixture was applied to a 40 μm-thick Al foil, which was to serve as a current collector, dried at 60° C. for one hour, and dried in a vacuum at 150° C. for eight hours, thereby obtaining a positive electrode for a lithium secondary battery. The electrode area of the positive electrode for a lithium secondary battery was set to 34.96 $cm^2$.

<Production of Negative Electrode for Lithium Secondary Battery>

A paste-form negative electrode mixture was prepared by adding and kneading artificial graphite, styrene-butadiene rubber (SBR), and carboxymethylcellulose (CMC) so as to achieve a composition of artificial graphite:SBR:CMC=98: 1:1 (mass ratio). During the preparation of the negative electrode mixture, pure water was used as a solvent.

The obtained negative electrode mixture was applied to a 12 μm-thick Cu foil, which was to serve as a current collector, dried at 60° C. for one hour, and dried in a vacuum at 120° C. for eight hours, thereby obtaining a negative electrode for a lithium secondary battery. The electrode area of the negative electrode for a lithium secondary battery was set to 37.44 $cm^2$.

<XPS Measurement of Positive Electrode>

The positive electrode was measured using an X-ray photoelectron spectroscopic analyzer ["K-Alpha" manufactured by Thermo Fisher Scientific Inc.], and the peak area ($Li_{54\ eV}$) of a peak at 54 eV that appeared at the time of the waveform separation of the spectrum in a binding energy range of 53 eV to 57 eV and the peak area ($Li_{55\ eV}$) of a peak at 55 eV were measured.

The measurement conditions are as shown below.

X-ray: AlKα (black and white) 12 kV 6 mA
Spot size: 400 μm
Pass Energy: 50 eV
Neutralization gun charge balance: 0.3 V 100 μA
Step: 0.1 eV
Dwell time: 500 ms
Measuring element: Li1s
Charge correction: Correction at C1s of 284.6 eV From the obtained $Li_{54\ eV}$ and $Li_{55\ eV}$, the ratio (XA) occupied by $Li_{55\ eV}$ was calculated by the following equation (A).

$$XA = Li_{55\ eV}/(Li_{54\ eV} + Li_{55\ eV}) \times 100 \quad (A)$$

Example 1

Production of Lithium Metal Composite Oxide Powder 1

After water was poured into a reaction vessel including a stirrer and an overflow pipe, a sodium hydroxide aqueous solution was added thereto, and the liquid temperature was held at 50° C.

A nickel sulfate aqueous solution, a cobalt sulfate aqueous solution, and a manganese sulfate aqueous solution, and a solution of zirconium sulfate were mixed in ratios in which the atom ratio of nickel atoms, cobalt atoms, manganese atoms, and zirconium atoms became 0.55:0.21:0.235:0.005, thereby preparing a mixed raw material liquid 1.

Next, the mixed raw material liquid 1 and an ammonium sulfate aqueous solution, as a complexing agent, were continuously added into the reaction vessel under stirring, and nitrogen gas was continuously aerated into the reaction vessel. A sodium hydroxide aqueous solution was timely added dropwise such that the pH of the solution in the reaction vessel reached 11.9 (when measured at a liquid temperature of 40° C.). The pH was controlled to become 11.4±0.3. Nickel cobalt manganese zirconium composite hydroxide particles were obtained, washed, then, dehydrated with a centrifuge, washed, dehydrated, isolated, and dried at 105° C., thereby obtaining a nickel cobalt manganese zirconium composite hydroxide 1.

The nickel cobalt manganese zirconium composite hydroxide 1 and a lithium hydroxide powder were weighed and mixed in ratios in which the mole ratio Li/(Ni+Co+Mn+Zr) reached 1.05, then, calcined at 650° C. for five hours in an oxygen atmosphere, crushed, and then secondarily calcined at 970° C. for five hours in an oxygen atmosphere, thereby obtaining a raw material compound 1.

Next, boric acid was weighed and added to a slurry produced by mixing the raw material compound 1 and pure water in ratios in which the ratio of the weight of the powder (raw material compound 1) to the total amount reached 0.5 in ratios in which the mole ratio of the boric acid (B/(Ni+Co+Mn+Zr)) reached 0.01. After that, the slurry was stirred for 20 minutes, dehydrated and isolated, and thermally treated at 400° C. for five hours in an oxygen-containing atmosphere, thereby obtaining a lithium metal composite oxide powder 1.

M/(Ni+X) of the lithium metal composite oxide powder 1 was 0.71 mol %, and the Ni/(Ni+X) was 0.55.

Example 2

Production of Lithium Metal Composite Oxide Powder 2

After water was poured into a reaction vessel including a stirrer and an overflow pipe, a sodium hydroxide aqueous solution was added thereto, and the liquid temperature was held at 70° C.

A nickel sulfate aqueous solution, a cobalt sulfate aqueous solution, and a manganese sulfate aqueous solution, and a solution of zirconium sulfate were mixed in ratios in which the atom ratio of nickel atoms, cobalt atoms, manganese atoms, and zirconium atoms became 0.60:0.20:0.195:0.005, thereby preparing a mixed raw material liquid 2.

Next, the mixed raw material liquid 2 and an ammonium sulfate aqueous solution, as a complexing agent, were continuously added into the reaction vessel under stirring, and nitrogen gas was continuously aerated into the reaction vessel. A sodium hydroxide aqueous solution was timely added dropwise such that the pH of the solution in the reaction vessel reached 10.7 (when measured at a liquid temperature of 40° C.). The pH was controlled to become 10.7±0.3. Nickel cobalt manganese zirconium composite hydroxide particles were obtained, washed, then, dehydrated with a centrifuge, washed, dehydrated, isolated, and dried at 105° C., thereby obtaining a nickel cobalt manganese zirconium composite hydroxide 2.

The nickel cobalt manganese zirconium composite hydroxide 2 and a lithium hydroxide powder were weighed and mixed in ratios in which the mole ratio Li/(Ni+Co+Mn+Zr) reached 1.04, then, calcined at 650° C. for five hours in an oxygen atmosphere, crushed, and then secondarily calcined at 970° C. for five hours in an oxygen atmosphere, thereby obtaining a raw material compound 2.

Next, the raw material compound 2 and boric acid were weighed and mixed in ratios in which the mole ratio B/(Ni+Co+Mn+Zr) reached 0.02 and then thermally treated at 400° C. for five hours in an oxygen-containing atmosphere, thereby obtaining a lithium metal composite oxide powder 2.

M/(Ni+X) of the lithium metal composite oxide powder 2 was 1.69 mol %, and the Ni/(Ni+X) was 0.6.

Example 3

Production of Lithium Metal Composite Oxide Powder 3

The nickel cobalt manganese zirconium composite hydroxide 2 and a lithium hydroxide powder were weighed and mixed in ratios in which the mole ratio Li/(Ni+Co+Mn+Zr) reached 1.04, then, calcined at 650° C. for five hours in an oxygen atmosphere, crushed, and then secondarily calcined at 950° C. for five hours in an oxygen atmosphere, thereby obtaining a raw material compound 3.

Next, the raw material compound 3 and boric acid were weighed and mixed in ratios in which the mole ratio B/(Ni+Co+Mn+Zr) reached 0.02 and then thermally treated at 200° C. for five hours in an oxygen-containing atmosphere, thereby obtaining a lithium metal composite oxide powder 3.

M/(Ni+X) of the lithium metal composite oxide powder 3 was 1.67 mol %, and the Ni/(Ni+X) was 0.6.

Example 4

Production of Lithium Metal Composite Oxide Powder 4

The nickel cobalt manganese zirconium composite hydroxide 1 and a lithium hydroxide powder were weighed and mixed in ratios in which the mole ratio Li/(Ni+Co+Mn+Zr) reached 1.03, then, calcined at 650° C. for five hours in an oxygen atmosphere, crushed, and then secondarily calcined at 1015° C. for five hours in an oxygen atmosphere, thereby obtaining a raw material compound 4.

Next, the raw material compound 4 and boric acid were weighed and mixed in ratios in which the mole ratio B/(Ni+Co+Mn+Zr) reached 0.005 and then thermally treated at 400° C. for five hours in an oxygen atmosphere with a relative humidity of 10% or less, thereby obtaining a lithium metal composite oxide powder 4.

M/(Ni+X) of the lithium metal composite oxide powder 4 was 0.46 mol %, and the Ni/(Ni+X) was 0.55.

Comparative Example 1

Production of Lithium Metal Composite Oxide Powder 5

The nickel cobalt manganese zirconium composite hydroxide 1, a lithium hydroxide powder, and a potassium sulfate powder were weighed and mixed in ratios in which Li/(Ni+Co+Mn+Zr) (mole ratio) reached 1.07 and $K_2SO_4$/(LiOH+$K_2SO_4$) reached 0.1 (mol/mol), then, calcined at 650° C. for five hours in an oxygen atmosphere, crushed, and then secondarily calcined at 940° C. for five hours in an oxygen atmosphere, thereby obtaining a raw material compound 5.

Next, boric acid was weighed and added to a slurry produced by mixing the raw material compound 5 and pure water in ratios in which the ratio of the weight of the powder (raw material compound 5) to the total amount reached 0.5 such that the mole ratio of the boric acid (B/(Ni+Co+Mn+Zr)) reached 0.007. After that, the slurry was stirred for 20 minutes, dehydrated and isolated, and thermally treated at 300° C. for five hours in an oxygen-containing atmosphere, thereby obtaining a lithium metal composite 5 oxide powder 5.

M/(Ni+X) of the lithium metal composite oxide powder 5 was 0.50 mol %, and the Ni/(Ni+X) was 0.6.

The results of the compositions and the like of Examples 1 to 4 and Comparative 10 Example 1 are summarized in Table 1. In Table 1, M/(Ni+X) is expressed as "B content (mol %)".

TABLE 1

| Item | Example 1 | Example 2 | Example 3 | Example 4 | Comparative Example 1 |
|---|---|---|---|---|---|
| Li/Me ratio | 1.05 | 1.04 | 1.04 | 1.03 | 1.07 |
| Ni/Co/Mn | 55/20/25 | 60/20/20 | 60/20/20 | 55/20/25 | 60/20/20 |
| BET (m$^2$/g) | 0.79 | 0.50 | 0.57 | 0.47 | 0.80 |
| Amount of B added (mol %) | 1.0 | 2.0 | 2.0 | 0.5 | 0.7 |
| B content (mol %) | 0.71 | 1.69 | 1.67 | 0.46 | 0.50 |
| D$_{50}$ (μm) | 4.1 | 6.4 | 5.5 | 5.3 | 4.0 |
| Crystallite size L$_A$ (Å) | 887 | 904 | 861 | 923 | 834 |
| Crystallite size L$_B$ (Å) | 917 | 937 | 885 | 982 | 934 |
| L$_A$/L$_B$ | 0.97 | 0.97 | 0.97 | 0.94 | 0.89 |
| Residual lithium hydroxide/residual lithium carbonate (mass %) | 0.13/0.12 | 0.34/0.28 | 0.12/0.08 | 0.12/0.08 | 0.12/0.12 |
| Secondary calcining temperature (° C.) | 970 | 970 | 950 | 1015 | 940 |
| Thermal treatment temperature (° C.) | 400 | 400 | 200 | 400 | 300 |
| Ratio of boron eluted into N-methyl-2-pyrrolidone | 0.021 | 0.005 | 0.011 | 0.013 | 0.099 |
| Amount of Ni eluted (μg/g) | 8.9 | 8.7 | 9.5 | 7.4 | 11.1 |
| XPS LiIs Li$_{54e}$V | 13.3 | 9.1 | 5.2 | 14.7 | 13.7 |
| XPS LiIs Li$_{55e}$V | 6.0 | 12.9 | 11.5 | 6.8 | 3.3 |
| Ratio occupied by Li$_{55e}$V (%) | 31 | 59 | 69 | 32 | 19 |

As shown in the above-described results, in Examples 1 to 4 in which the ratio of boron eluted into N-methyl-2-pyrrolidone, the amount of Ni eluted was smaller than that in Comparative Example 1.

REFERENCE SIGNS LIST

1: Separator
2: Positive electrode
3: Negative electrode
4: Electrode group
5: Battery can
6: Electrolytic solution
7: Top insulator
8: Sealing body
10: Lithium secondary battery
21: Positive electrode lead
31: Negative electrode lead
100: Laminate
110: Positive electrode
111: Positive electrode active material layer
112: Positive electrode current collector
113: External terminal
120: Negative electrode
121: Negative electrode electrolyte layer
122: Negative electrode current collector
123: External terminal
130: Solid electrolyte layer
200: Exterior body
200*a*: Opening portion
1000: All-solid-state lithium-ion battery

What is claimed is:

1. A lithium metal composite oxide powder having a layered structure, comprising:
    at least Li, Ni, an element X, and an element M,
    wherein the element X is one or more elements selected from the group consisting of Co, Mn, Fe, Cu, Ti, Mg, Al, W, Mo, Nb, Zn, Sn, Zr, Ga, and V,
    the element M is B,
    M/(Ni+X) that is a content ratio of the element M to a total amount of Ni and the element X that are contained in the lithium metal composite oxide powder is 0.01 mol % or more and 5 mol % or less,
    Ni/(Ni+X) that is a content ratio of Ni to the total amount of Ni and the element X that are contained in the lithium metal composite oxide powder satisfies 0.40 or more in terms of a mole ratio, and
    a ratio of the element M eluted into N-methyl-2-pyrrolidone measured under the following measurement conditions is 0.09 or less, and
    wherein measurement conditions are as follows:
    1 g of the lithium metal composite oxide powder is weighed and immersed in N-methyl-2-pyrrolidone weighed to 3.5 g, thereby preparing a measurement sample, the measurement sample is put into a closed container and left at room temperature of 25° C. for 96 hours, after that, the measurement sample is centrifuged at 3000 rpm for 10 minutes, after the centrifugation, 100 μL of a supernatant is collected, and a content ratio of the element M that is contained in 100 μL of the supernatant is measured, the ratio of the element M eluted into N-methyl-2-pyrrolidone is calculated by the following equation, and the ratio of element M eluted into N-methyl-2-pyrrolidone=(amount of element M eluted into N-methyl-2-pyrrolidone)/(amount of element M in lithium metal composite oxide powder before immersed in N-methyl-2-pyrrolidone).

2. The lithium metal composite oxide powder according to claim 1,
wherein a BET specific surface area is more than 0.30 m$^2$/g and less than 0.80 m$^2$/g.

3. The lithium metal composite oxide powder according to claim 1,
wherein $D_{50}$ that is a 50% cumulative diameter obtained from a particle size distribution measurement value is 4.1 μm or more and 10.0 μm or less.

4. The lithium metal composite oxide powder according to claim 1,
wherein, in powder X-ray diffraction measurement using a CuKα ray, a crystallite size in a peak within a range of $2\theta=18.7\pm1°$ is more than 840 Å.

5. The lithium metal composite oxide powder according to claim 1,
wherein the ratio of the element M eluted into N-methyl-2-pyrrolidone is more than 0.001 and 0.04 or less.

6. A positive electrode active material for a lithium secondary battery, comprising:
the lithium metal composite oxide powder according to claim 1.

7. A positive electrode comprising:
the positive electrode active material for a lithium secondary battery according to claim 6.

8. A positive electrode for a lithium secondary battery comprising a positive electrode active material,
wherein the positive electrode active material comprises the lithium metal composite oxide powder according to claim 1, and
wherein a ratio (XA) occupied by $Li_{55\ eV}$ that is calculated by the following equation (A) from a spectrum obtained by measuring a surface of the positive electrode for a lithium secondary battery by XPS is 30% or more, $$XA=Li_{55\ eV}/(Li_{54\ eV}+Li_{55\ eV})\times 100 \tag{A}$$

in the equation (A), $Li_{54\ eV}$ is a peak area of a peak at 54 eV that appears at the time of waveform separation of the spectrum obtained by measuring the surface of the positive electrode for a lithium secondary battery by XPS, and $Li_{55\ eV}$ means a peak area of a peak at 55 eV.

9. A lithium secondary battery comprising:
the positive electrode for a lithium secondary battery according to claim 7.

10. A lithium secondary battery comprising:
the positive electrode for a lithium secondary battery according to claim 8.

* * * * *